(12) United States Patent
Urano

(10) Patent No.: US 8,800,738 B2
(45) Date of Patent: Aug. 12, 2014

(54) WIRELESS POWER FEEDER AND WIRELESS POWER RECEIVER

(75) Inventor: Takashi Urano, Tokyo (JP)

(73) Assignee: TDK Corporation, Tokyo (JP)

( * ) Notice: Subject to any disclaimer, the term of this patent is extended or adjusted under 35 U.S.C. 154(b) by 244 days.

(21) Appl. No.: 13/170,782

(22) Filed: Jun. 28, 2011

(65) Prior Publication Data

US 2012/0161530 A1 Jun. 28, 2012

Related U.S. Application Data

(60) Provisional application No. 61/427,651, filed on Dec. 28, 2010.

(51) Int. Cl.
| | |
|---|---|
| *B60L 9/00* | (2006.01) |
| *B60L 5/00* | (2006.01) |
| *H02J 7/02* | (2006.01) |
| *H04B 5/00* | (2006.01) |

(52) U.S. Cl.
CPC .............. *H02J 7/025* (2013.01); *H04B 5/0037* (2013.01)
USPC ............................................ 191/10; 307/104

(58) Field of Classification Search
CPC ..... H02J 7/025; H04B 5/0037; Y02T 90/122; B60L 11/182; B60L 5/005; B60L 11/1831; B60L 9/00; B60L 5/00
USPC .............. 191/10, 6, 14, 15; 307/104; 320/108
See application file for complete search history.

(56) References Cited

U.S. PATENT DOCUMENTS

| | | | | |
|---|---|---|---|---|
| 5,431,264 | A | * | 7/1995 | Tseng et al. ..................... 191/10 |
| 5,821,728 | A | * | 10/1998 | Schwind ....................... 320/108 |
| 7,741,734 | B2 | | 6/2010 | Joannopoulos et al. |
| 8,378,525 | B2 | * | 2/2013 | Yoshikawa .................... 307/104 |
| 2007/0222542 | A1 | | 9/2007 | Joannopoulos et al. |
| 2008/0211320 | A1 | | 9/2008 | Cook et al. |
| 2008/0278264 | A1 | | 11/2008 | Karalis et al. |
| 2009/0015075 | A1 | | 1/2009 | Cook et al. |
| 2009/0045772 | A1 | | 2/2009 | Cook et al. |
| 2009/0051224 | A1 | | 2/2009 | Cook et al. |
| 2009/0058189 | A1 | | 3/2009 | Cook et al. |
| 2009/0072627 | A1 | | 3/2009 | Cook et al. |
| 2009/0072628 | A1 | | 3/2009 | Cook et al. |
| 2009/0072629 | A1 | | 3/2009 | Cook et al. |

(Continued)

FOREIGN PATENT DOCUMENTS

| | | |
|---|---|---|
| JP | 2002-354712 | 12/2002 |
| JP | 2006-230032 | 8/2006 |

(Continued)

*Primary Examiner* — Mark Le
(74) *Attorney, Agent, or Firm* — McDermott Will & Emery LLP

(57) ABSTRACT

A wireless power feeder 116 feeds power from a feeding coil L2 in the ground to a receiving coil L3 incorporated in an EV by wireless using a magnetic field resonance phenomenon between the feeding coil L2 and receiving coil L3. A plurality of feeding coils L2*a* to L2*d* are buried in the ground. Receivers 112*a* to 112*d* are buried in corresponding respectively with the feeding coils L2*a* to L2*d*. The plurality of receivers 112 each receive a position signal transmitted from a transmitter 110 of the EV. A feeding coil circuit 120 supplies AC power to the feeding coil L2 corresponding to the receiver 112 that has received the position signal to allow the feeding coil L2 to feed power to the receiving coil L3 by wireless.

13 Claims, 19 Drawing Sheets

(56) References Cited

U.S. PATENT DOCUMENTS

| | | |
|---|---|---|
| 2009/0079268 A1 | 3/2009 | Cook et al. |
| 2009/0102292 A1 | 4/2009 | Cook et al. |
| 2009/0134712 A1 | 5/2009 | Cook et al. |
| 2009/0167449 A1 | 7/2009 | Cook et al. |
| 2009/0179502 A1 | 7/2009 | Cook et al. |
| 2009/0195332 A1 | 8/2009 | Joannopoulos et al. |
| 2009/0195333 A1 | 8/2009 | Joannopoulos et al. |
| 2009/0212636 A1 | 8/2009 | Cook et al. |
| 2009/0213028 A1 | 8/2009 | Cook et al. |
| 2009/0224608 A1 | 9/2009 | Cook et al. |
| 2009/0224609 A1 | 9/2009 | Cook et al. |
| 2009/0224856 A1 | 9/2009 | Karalis et al. |
| 2009/0243397 A1 | 10/2009 | Cook et al. |
| 2009/0267709 A1 | 10/2009 | Joannopoulos et al. |
| 2009/0267710 A1 | 10/2009 | Joannopoulos et al. |
| 2009/0273242 A1 | 11/2009 | Cook |
| 2009/0284083 A1 | 11/2009 | Karalis et al. |
| 2009/0302688 A1* | 12/2009 | Boys ............................ 307/104 |
| 2010/0038970 A1 | 2/2010 | Cook et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Joannopoulos et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0141042 A1 | 6/2010 | Kesler et al. |
| 2010/0148589 A1 | 6/2010 | Hamam et al. |
| 2011/0285210 A1* | 11/2011 | Lemmens et al. ............ 307/104 |

FOREIGN PATENT DOCUMENTS

| | | |
|---|---|---|
| JP | 4140208 | 6/2008 |
| JP | 2008-288889 | 11/2008 |
| JP | 2009-071909 | 4/2009 |
| JP | 2009-106136 | 5/2009 |
| JP | 2009-261104 | 11/2009 |
| JP | 2009-261105 | 11/2009 |
| JP | 4453741 | 2/2010 |
| JP | 2010-063245 | 3/2010 |
| JP | 2010-104159 | 5/2010 |
| JP | 2010-130878 | 6/2010 |
| JP | 2010-166693 | 7/2010 |
| JP | 4557045 | 7/2010 |
| JP | 2010-173503 | 8/2010 |
| JP | 2010-219838 | 9/2010 |
| JP | 2010-233442 | 10/2010 |
| JP | 2010-239690 | 10/2010 |
| JP | 2010-239769 | 10/2010 |
| JP | 2010-239777 | 10/2010 |
| JP | 2010-239816 | 10/2010 |
| JP | 2010-239838 | 10/2010 |
| JP | 2010-239847 | 10/2010 |
| JP | 2010-239848 | 10/2010 |
| JP | 2010-252446 | 11/2010 |
| JP | 2010-267917 | 11/2010 |
| JP | 2010-268664 | 11/2010 |
| JP | 2010-268665 | 11/2010 |
| JP | 2010-272412 | 12/2010 |
| JP | 2010-288441 | 12/2010 |
| JP | 2011-003947 | 1/2011 |
| WO | WO 2006/022365 A1 | 3/2006 |

* cited by examiner

WIRELESS POWER FEEDER AND WIRELESS POWER RECEIVER

RELATED APPLICATIONS

This application claims priority of U.S. Provisional Application No. 61/427,651 filed Dec. 28, 2010. The disclosure of this application including the specification, the drawings, and the claims are hereby incorporated by reference in their entirety.

BACKGROUND OF THE INVENTION

1. Field of the Invention

The present invention relates to a wireless AC power feeding and, more particularly, to power control thereof.

2. Description of Related Art

As an eco-friendly next-generation vehicle, an EV (Electric Vehicle) is now attracting attention. Since the EV travels by an electric motor, it needs to be provided with a secondary battery (storage battery). It is said, in general, that a travel distance of as small as about 100 km is achieved by a fully charged secondary battery mounted in the EV. When the capacity of the second battery is increased, the vehicle weight is unfavorably increased.

A wireless power feeding technique of feeding power without a power cord is now attracting attention. The current wireless power feeding technique is roughly divided into three: (A) type utilizing electromagnetic induction (for short range); (B) type utilizing radio wave (for long range); and (C) type utilizing resonance phenomenon of magnetic field (for intermediate range).

Among the above types (A) to (C), the type (C) utilizing magnetic field resonance phenomenon is of particular interest because of its high power transmission efficiency. For example, a plan is being studied in which a receiving coil is buried in a lower portion of the EV so as to feed power from a feeding coil in the ground in a non-contact manner (Refer to Patent Document 7). The wireless configuration allows a completely insulated system to be achieved, which is especially effective for power feeding in the rain. Hereinafter, the type (C) is referred to as "magnetic field resonance type".

The magnetic field resonance type is based on a theory published by Massachusetts Institute of Technology in 2006 (refer to Patent Document 1). In the magnetic resonance type, a resonance circuit (LC circuit) is formed on both the power feeding side and power receiving side, respectively. The resonance frequency of the power feeding side resonance circuit and that of the power receiving side resonance circuit are made to coincide with each other. When the power feeding side resonance circuit is made to resonate at a resonance frequency fr1, the power receiving side resonance circuit resonates at a resonance frequency fr1. At this time, AC power can be fed with the maximum power transmission efficiency (refer to Patent Document 6).

CITATION LIST

Patent Document

[Patent Document 1]
U.S. Patent Application Publication No. 2008-0278264
[Patent Document 2]
Jpn. Pat. Appln. Laid-Open Publication No. 2006-230032
[Patent Document 3]
International Publication No. WO2006-022365
[Patent Document 4]
U.S. Patent Application Publication No. 2009-0072629
[Patent Document 5]
U.S. Patent Application Publication No. 2009-0015075
[Patent Document 6]
U.S. Pat. No. 7,741,734
[Patent Document 7]
Japanese Patent No. 4453741

In Patent Document 7, power is fed from a primary self-resonant coil (feeding coil) in the ground to a secondary self-resonant coil (receiving coil) in the vehicle by wireless. In this technique, the resonance frequency of the self-resonant coil is adjusted in accordance with the distance between the primary self-resonant coil and secondary self-resonant coil to thereby stabilize the power transmission efficiency (refer to paragraph [0069] of Patent Document 7).

Patent Document 7 proposes various adjustment method of the resonance frequency of the self-resonant coil. In FIG. 6 of Patent Document 7, the capacity of a variable capacitor is changed; however, there is no concrete description of the adjustment method. In FIG. 7, in place of the variable capacitor, a variable capacity diode is inserted in the secondary self-resonant coil; however, there is also no concrete description of the adjustment method. In FIG. 8, a switch is used to connect the coils to thereby change the inductance; however, this method only achieves adjustment of several stages but cannot achieve precise adjustment. In FIGS. 15 and 16, an ECU (Electric Control Unit) is used to adjust the frequency (resonance frequency) of high-frequency power; in this case, however, software control is required, which complicates the system configuration.

The present invention has been made in view of the above problems, and an main object thereof is to control a plurality of feeding coils so as to stably supply electric power to a receiving body.

SUMMARY

A wireless power feeder according to the present invention is a device for feeding power from a feeding coil to a receiving coil by wireless using a magnetic field resonance phenomenon between the feeding coil and receiving coil. The wireless power feeder includes: a plurality of the feeding coils; a plurality of receivers that are provided respectively in correspondence with the plurality of feeding coils and each receives a position signal from a receiving body having the receiving coil; and a power transmission control circuit that supplies AC current at a drive frequency to the feeding coil corresponding to the receiver that has received the position signal to allow the feeding coil to feed AC power to the receiving coil.

The "magnetic field resonance phenomenon between the feeding coil and receiving coil" refers to a resonance phenomenon occurring in a receiving coil circuit based on an AC magnetic field generated by a feeding coil. When AC current of a drive frequency is supplied to the feeding coil, the feeding coil generates an AC magnetic field of a drive frequency. Based on this AC magnetic field, the feeding coil and receiving coil are coupled (magnetically coupled) to each other mainly by a magnetic field component to make the receiving coil circuit resonate. At this time, high AC current flows in the receiving coil. Which one of the plurality of feeding coils is closest to a receiving body (receiving coil) is determined according to the position signal. Then, the feeding coil to be driven is selected based on the position signal, thereby making it easy to achieve optimum wireless feeding depending on the position of the receiving body.

The wireless power feeder may further include a selection circuit that exclusively selects one of the receivers even when two or more receivers have received the position signal. The power transmission control circuit may supply the AC power to the feeding coil corresponding to the selected receiver.

The resonance frequency of the wireless power feeder changes depending on the number of the feeding coils to be driven. In this case, when the selection circuit is used to exclusively select one of the plurality of feeding coils, the resonance frequency can easily be made stable.

The wireless power feeder may further include a phase detection circuit that detects the phase difference between the voltage phase and current phase of the AC power. The power transmission control circuit may adjust the drive frequency such that the detected phase difference is reduced.

The power transmission control circuit may make the feeding coil that does not substantially resonate with circuit elements on the power feeding side feed the AC power to the receiving coil.

The phrase "does not substantially resonate" mentioned here means that the resonance of the feeding coil is not essential for the wireless power feeding, but does not mean that even an accidental resonance of the feeding coil with some circuit element is eliminated.

A configuration may be possible in which the feeding coil does not constitute a resonance circuit that resonates with power feeding side circuit elements at a resonance point corresponding to the resonance frequency of the receiving coil. Further, a configuration may be possible in which no capacitor is connected in series or in parallel to the feeding coil.

The plurality of feeding coils may be buried in the ground so as to feed power by wireless to the receiving body that travels on the ground.

A wireless power receiver according to the present invention is a device that receives AC power fed from the above-mentioned wireless power feeder by wireless at a receiving coil. The wireless power receiver includes: the receiving coil; a transmitter that transmits a position signal representing the self position; and a loading coil that is magnetically coupled to the receiving coil to receive the AC power that the receiving coil has received from the feeding coil.

The wireless power receiver may further include a storage battery that is connected to the loading coil and is charged by the received AC power. The wireless power receiver may be constructed as a moving body that uses the AC power received by the loading coil as a power source. The moving body includes, e.g., a car, a motorcycle, a bicycle, and an electric train.

It is to be noted that any arbitrary combination of the above-described structural components and expressions changed between a method, an apparatus, a system, etc. are all effective as and encompassed by the present embodiments.

According to the present invention, by controlling the plurality of feeding coils, power can stably be supplied to the receiving body.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE EMBODIMENTS

Hereinafter, with reference to the accompanying drawings, preferred embodiment of the present invention will be described.

First Embodiment

Figure 1:
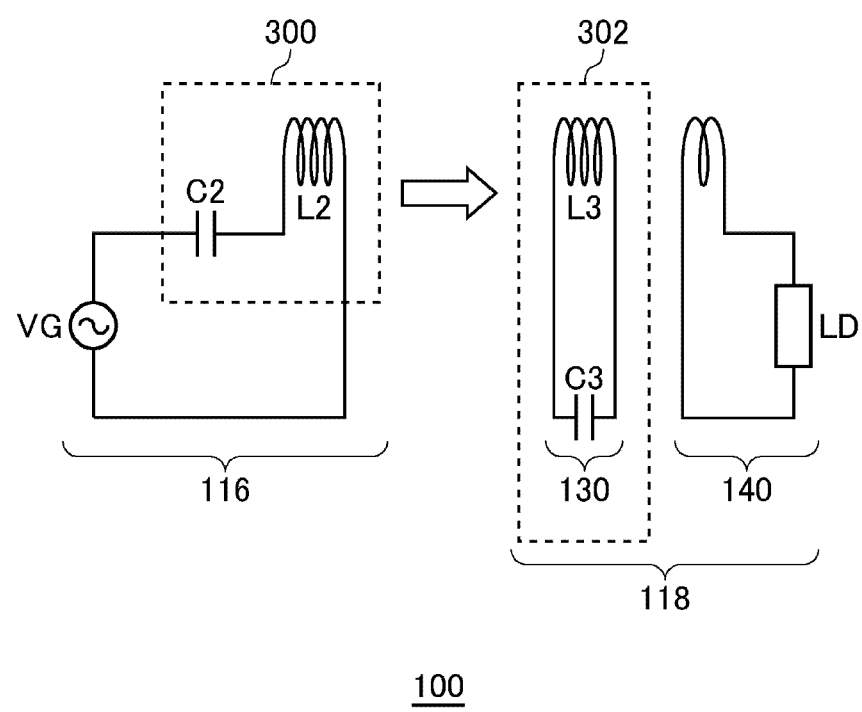
FIG. 1 is a view illustrating operation principle of a wireless power transmission system according to a first embodiment.

FIG. 1 is a view illustrating operation principle of a wireless power transmission system 100 according to the first embodiment. The wireless power transmission system 100 in the first embodiment includes a wireless power feeder 116 and a wireless power receiver 118. The wireless power feeder 116 includes a power feeding LC resonance circuit 300. The wireless power receiver 118 includes a receiving coil circuit 130 and a loading circuit 140. A power receiving LC resonance circuit 302 is formed by the receiving coil circuit 130.

The power feeding LC resonance circuit 300 includes a capacitor C2 and a feeding coil L2. The power receiving LC resonance circuit 302 includes a capacitor C3 and a receiving coil L3. The values of the capacitor C2, feeding coil L2, capacitor C3, and receiving coil L3 are set such that the resonance frequencies of the feeding LC resonance circuit 300 and receiving LC resonance circuit 302 coincide with each other in a state where the feeding coil L2 and receiving coil L3 are disposed away from each other far enough to ignore the magnetic field coupling therebetween. This common resonance frequency is assumed to be fr0.

In a state where the feeding coil L2 and receiving coil L3 are brought close to each other in such a degree that they can be magnetic-field-coupled to each other, a new resonance circuit is formed by the power feeding LC resonance circuit 300, power receiving LC resonance circuit 302, and mutual inductance generated between them. The new resonance circuit has two resonance frequencies fr1 and fr2 (fr1<fr0<fr2) due to the influence of the mutual inductance. When the wireless power feeder 116 supplies AC power from a power feeding source VG to the power feeding LC resonance circuit 300 at the resonance frequency fr1, the power feeding LC resonance circuit 300 constituting a part of the new resonance circuit resonates at a resonance point 1 (resonance frequency fr1). When the power feeding LC resonance circuit 300 resonates, the feeding coil L2 generates an AC magnetic field of the resonance frequency fr1. The power receiving LC resonance circuit 302 constituting a part of the new resonance circuit also resonates by receiving the AC magnetic field. When the power feeding LC resonance circuit 300 and power receiving LC resonance circuit 302 resonate at the same resonance frequency fr1, wireless power feeding from the feeding coil L2 to receiving coil L3 is performed with the maximum power transmission efficiency. Received power is taken from a load LD of the wireless power receiver 118 as output power. Note that the new resonance circuit can resonate not only at the resonance point 1 (resonance frequency fr1) but also at a resonance point 2 (resonance frequency fr2).

Figure 2:
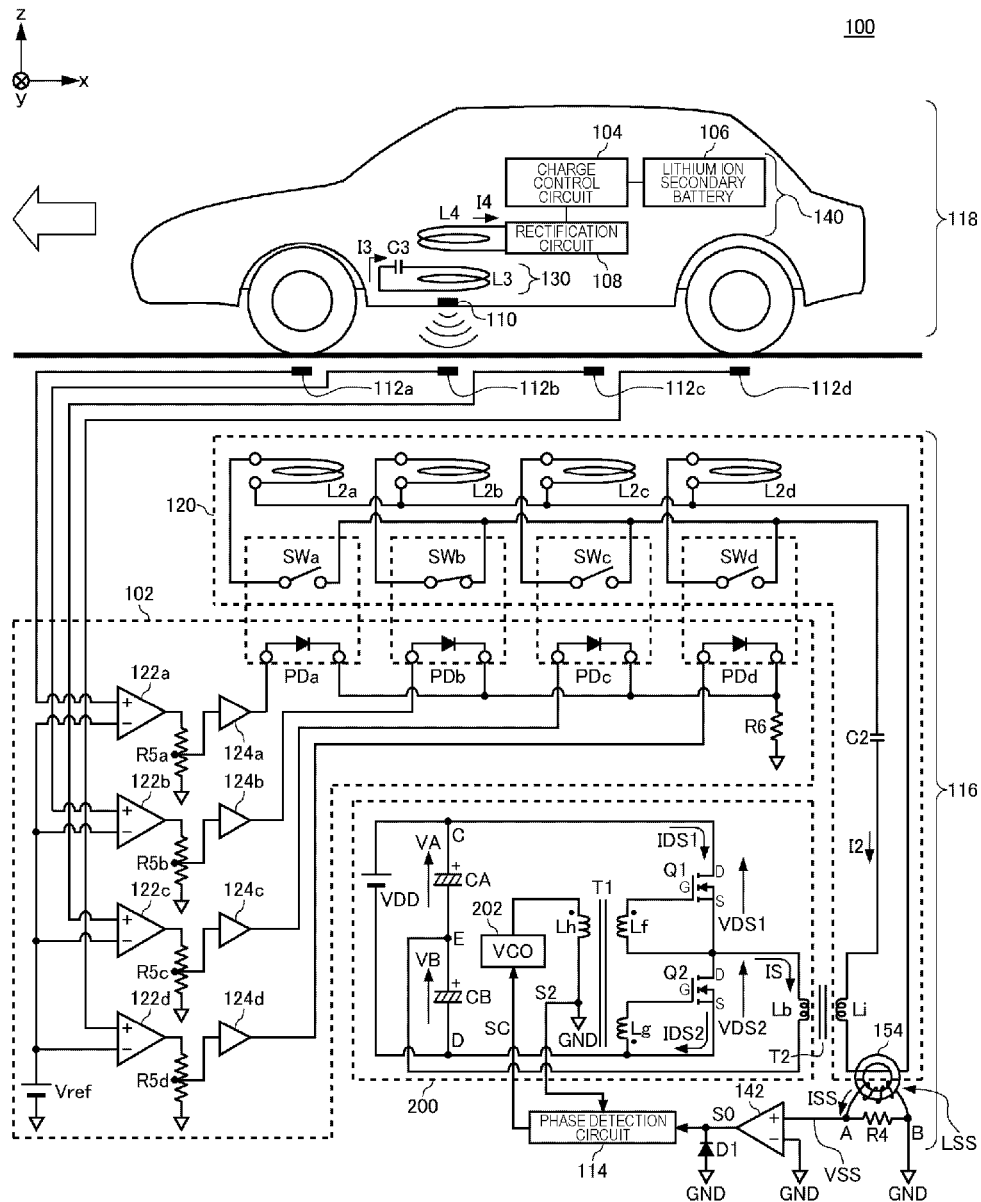
FIG. 2 is a system configuration view of the wireless power transmission system according to the first embodiment.

FIG. 2 is a system configuration view of the wireless power transmission system 100 according to the first embodiment. The wireless power receiver 118 (receiving body) in the present embodiment is embodied as an EV that travels on the ground. The wireless power receiver 118 may be embodied as other moving objects such as pedestrian's personal effects or electric train. The wireless power feeder 116 (feeding body) in the first embodiment is provided underground, and the feeding coil L2 is buried near the ground surface. The right direction in FIG. 2 is defined as the positive direction of x-axis, the upper direction is defined as the positive direction of z-axis, and direction from the front to depth is defined as the positive direction of y-axis. The wireless power receiver 118 is assumed to travel in the x-axis negative direction.

The wireless power feeder 116 includes, as basic components, a power transmission control circuit 200, a feeding coil circuit 120, a selection circuit 102, and a phase detection circuit 114. The power transmission control circuit 200 includes a VCO (Voltage Controlled Oscillator) 202. The wireless power receiver 118 includes the receiving coil circuit 130 and loading circuit 140.

The feeding coil circuit 120 includes a plurality of feeding coils L2a to L2d (hereinafter, referred to merely as "feeding coil L2" when collectively referred to). A distance (inter-coil distance) of about 0.02 m to 1.0 m is provided between each of the feeding coils L2 and receiving coil L3 included in the receiving coil circuit 130 when opposed to each other. The wireless power transmission system 100 mainly aims to feed AC power from the feeding coil L2 to the receiving coil L3 by wireless. In the present embodiment, the resonance frequency fr1 is assumed to be 100 kHz. Note that the wireless power transmission system according to the present embodiment can operate also in a high-frequency band such as ISM (Industry-Science-Medical) frequency band. A low frequency band is advantageous over a high frequency band in reduction of cost of a switching transistor (to be described later) and reduction of switching loss. In addition, the low frequency band is less constrained by Radio Act.

The feeding coil circuit 120 is a circuit in which the four feeding coils L2a to L2d are connected in parallel to a transformer T2 secondary coil L1. The feeding coils L2a to L2d are conduction-controlled by switches SWa to SWd, respectively. The switches SW are all photoswitches and controlled by corresponding photodiodes PD (details will be described later). Two or more of switches SWa to SWd are not tuned ON simultaneously. That is, two or more feeding coils L2 are not connected to the transformer T2 secondary coil Li simultaneously.

The transformer T2 secondary coil Li constitutes a coupling transformer T2 together with a transformer T2 primary coil Lb and receives AC power from the power transmission control circuit 200 by electromagnetic induction. The number of windings of the feeding coil L2 is 7, conductor diameter thereof is 5 mm, and shape of the feeding coil L2 itself is a square of 280 mm×280 mm. In FIG. 2, the feeding coil L2 is represented by a circle for simplicity. Other coils are also represented by circles for the same reason. All the coils illustrated in FIG. 2 are made of copper. The coils may be made of any other material such as aluminum. AC current I2 flows in the feeding coil circuit 120.

The receiving coil circuit 130 is an LC resonance circuit (receiving LC resonance circuit 302) in which the receiving coil L3 and capacitor C3 are connected in series. The feeding coil L2 and receiving coil L3 face each other. The number of windings of the receiving coil L3 is 7, conductor diameter thereof is 5 mm, and shape of the receiving coil L3 itself is a square of 280 mm×280 mm. The values of the receiving coil L3 and capacitor C3 are set such that the resonance frequency fr0 of the receiving coil circuit 130 is 100 kHz. The feeding coil L2 and receiving coil L3 need not have the same shape. When the feeding coil L2 generates an AC magnetic field at the frequency fr1=100 kHz, the feeding coil L2 and receiving coil L3 are magnetic-field coupled, causing high current I3 to flow in the receiving coil circuit 130. At this time, the receiving coil circuit 130 also resonates by receiving the AC magnetic field generated by the feeding coil L2.

The loading circuit 140 is a circuit in which a loading coil L4 and a rectification circuit 108, a charge control circuit 104, and a lithium ion secondary battery 106 are connected. The receiving coil L3 and loading coil L4 face each other. The distance between the receiving coil L3 and loading coil L4 is zero. Thus, the receiving coil L3 and loading coil L4 are electromagnetically strongly coupled (coupling based on electromagnetic induction) to each other. The number of windings of the loading coil L4 is 1, conductor diameter thereof is 5 mm, and shape of the loading coil L4 itself is a square of 300 mm×300 mm. When the current I3 is made to flow in the receiving coil L3, an electromotive force occurs in the loading circuit 140 to cause AC current I4 to flow in the loading circuit 140. The AC current I4 is converted into DC current by the rectification-smoothing function of rectification circuit 108. After the conversion into the DC current, the lithium ion secondary battery 106 is charged under the control of the charge control circuit 104.

As described above, the AC power fed by wireless from the feeding coil L2 of the wireless power feeder 116 is received by the receiving coil L3 of the wireless power receiver 118 and then charges the lithium ion secondary battery 106.

When the rectification circuit 108 and the like are directly connected to the receiving coil circuit 130, the Q-value of the receiving coil circuit 130 is degraded. Therefore, the receiving coil circuit 130 for power reception and loading circuit 140 for power extraction are separated from each other. In order to enhance power transmission efficiency, the center lines of the feeding coil L2, receiving coil L3, and loading coil L4 are preferably made to coincide with one another.

A configuration of the power transmission control circuit 200 will be described. The VCO 202 is connected to the primary side of a gate drive transformer T1. The VCO 202 functions as an "oscillator" that generates AC voltage V0 at the drive frequency fo. Although the waveform of the AC voltage V0 may be a sine wave, it is assumed here that the voltage waveform is a rectangular wave (digital waveform). The AC voltage V0 causes current to flow in a transformer T1 primary coil Lh alternately in both positive and negative directions. A transformer T1 primary coil Lh, a transformer T1 secondary coil Lf, and a transformer secondary coil Lg constitute a gate-drive coupling transformer T1.

Electromagnetic induction causes current to flow also in the transformer T1 secondary coil Lf and transformer T1 secondary coil Lg alternately in both positive and negative directions.

As the VCO 202 in the first embodiment, a built-in unit (product serial number MC14046B) manufactured by Motorola, Inc is used. The VCO 202 also has a function of dynamically changing the drive frequency fo based on phase difference indicating voltage SC fed from the phase detection circuit 114 (described later in detail).

Capacitors CA and CB charged by a DC power supply Vdd each serve as a power supply for the power transmission control circuit 200. The capacitor CA is provided between points C and E of FIG. 2, and capacitor CB is provided between points E and D. Assuming that the voltage (voltage between points C and E) of the capacitor CA is VA, voltage (voltage between points E and D) of the capacitor CB is VB, VA+VB (voltage between points C and D) represents input voltage. That is, the capacitors CA and CB each function as a DC voltage supply.

One end of the transformer T1 secondary coil Lf is connected to the gate of a switching transistor Q1, and the other end of the transformer T1 secondary coil Lf is connected to the source of a switching transistor Q1. One end of the transformer T1 secondary coil Lg is connected to the gate of a switching transistor Q2, and the other end of the transformer T1 secondary coil Lg is connected to the source of a switching transistor Q2. When VCO 202 generates AC voltage V0 at drive frequency fo, voltage Vx (Vx>0) is alternately applied, at drive frequency fo, to the gates of the switching transistors Q1 and Q2. As a result, the switching transistors Q1 and Q2 are alternately turned on/off at the drive frequency fo. The switching transistors Q1 and Q2 are enhancement type MOS-FET (Metal Oxide Semiconductor Field effect transistor) having the same characteristics but may be other transistors such as a bipolar transistor. Further, other switches such as a relay switch may be used in place of the transistor.

The drain of the switching transistor Q1 is connected to the positive electrode of the capacitor CA. The negative electrode of the capacitor CA is connected to the source of the switching transistor Q1 through the transformer T2 primary coil Lb. The source of the switching transistor Q2 is connected to the negative electrode of the capacitor CB. The positive electrode of the capacitor CB is connected to the drain of the switching transistor Q2 through the transformer T2 primary coil Lb.

Voltage between the source and drain of the switching transistor Q1 is referred to as source-drain voltage VDS1, and voltage between the source and drain of the switching transistor Q2 is referred to as source-drain voltage VDS2. Current flowing between the source and drain of the switching transistor Q1 is referred to as source-drain current IDS1, and current flowing between the source and drain of the switching transistor Q2 is referred to as source-drain current IDS2. The directions of arrows in the diagram indicate the positive directions, and directions opposite to the directions of the arrows indicate the negative directions.

When the switching transistor Q1 is turned conductive (ON), the switching transistor Q2 is turned non-conductive (OFF). A main current path (hereinafter, referred to as "first current path") at this time extends from the positive electrode of the capacitor CA, passes through the point C, switching transistor Q1, transformer T2 primary coil Lb, and point E in this order, and returns to the negative electrode of the capacitor CA. The switching transistor Q1 functions as a switch for controlling conduction/non-conduction of the first current path.

When the switching transistor Q2 is turned conductive (ON), the switching transistor Q1 is turned non-conductive (OFF). A main current path (hereinafter, referred to as "second current path") at this time extends from the positive electrode of the capacitor CB, passes through the point E, transformer T2 primary coil Lb, switching transistor Q2, and point D in this order, and returns to the negative electrode of the capacitor CB. The switching transistor Q2 functions as a switch for controlling conduction/non-conduction of the second current path.

Current flowing in the transformer T2 primary coil Lb in the power transmission control circuit 200 is referred to as "current IS". The current IS is AC current, and the current flow in a first current path is defined as the positive direction and current flow in a second current path is defined as the negative direction.

When the VCO 202 feeds the AC voltage V0 at the drive frequency fo, the first and second current paths are switched at the drive frequency fo. Since the AC current IS of the drive frequency fo flows in the transformer T2 primary coil Lb, the AC current I2 flows in the feeding coil circuit 120 at the drive frequency fo. The closer the drive frequency fo is to the resonance frequency fr1, the higher the power transmission efficiency becomes. When the drive frequency fo coincides with the resonance frequency fr1, the feeding coil L2 and receiving coil L3 are strongly magnetic-filed coupled. In this case, the maximum power transmission efficiency can be obtained.

The resonance frequency fr1 slightly changes depending on use condition or use environment of the receiving coil circuit 130. Further, in the case where the receiving coil circuit 130 is replaced with new one, the resonance frequency fr1 changes. Alternatively, there may be case where the resonance frequency fr1 needs to be changed aggressively by making the electrostatic capacitance of the capacitor C3 variable. Further, when the inter-coil distance between the feeding coil L2 and receiving coil L3 becomes small, the resonance frequency fr1 is reduced. When the difference between the resonance frequency fr1 and drive frequency fo changes, the power transmission efficiency also changes. Thus, in order to stably charge the lithium ion secondary battery 106, it is necessary to make the drive frequency fo to track the resonance frequency fr1 even when the resonance frequency fr1 changes.

A detection coil LSS is provided at the feeding coil circuit 120. The detection coil LSS is a coil wound around a core 154

(toroidal core) having a penetration hole NS times. The core 154 is formed of a known material such as ferrite, silicon steel, or permalloy. The number of windings NS of the detection coil LSS in the present embodiment is 100.

A part of the current path of the feeding coil circuit 120 penetrates the penetration hole of the core 154. This means that the number of windings NP of the feeding coil circuit 120 with respect to the core 154 is one. With the above configuration, the detection coil LSS and feeding coil L2 constitute a coupling transformer. An AC magnetic field generated by the AC current I2 of the feeding coil L2 causes inductive current ISS having the same phase as that of the current I2 to flow in the detection coil LSS. The magnitude of the inductive current ISS is represented by I2·(NP/NS) according to the law of equal ampere-turn.

A resistor R4 is connected to both ends of the detection coil LSS. One end B of the resistor R4 is grounded, and the other end A thereof is connected to the phase detection circuit 114 through a comparator 142.

The potential VSS is digitized by the comparator 142 to be an S0 signal. The high-frequency component of the S0 signal is cut by a diode D1. The comparator 142 outputs a saturated voltage of 3.0 (V) when the potential VSS exceeds a predetermined threshold value, e.g., 0.1 (V). The potential VSS is converted into the S0 signal of a digital waveform by the comparator 142. The current I2 and inductive current ISS have the same phase, and inductive current ISS and potential VSS (S0 signal) have the same phase. Further, the AC current IS flowing in the power transmission control circuit 200 and current I2 have the same phase. Therefore, by observing the waveform of the S0 signal, the current phase of the AC current IS can be measured.

When the resonance frequency fr1 and drive frequency fo coincide with each other, the current phase and voltage phase also coincide with each other. A deviation between the resonance frequency fr1 and drive frequency fo can be measured from the phase difference between the current phase and voltage phase. The wireless power transmission system 100 according to the present embodiment measures the deviation between the resonance frequency fr1 and drive frequency fo based on the phase difference to thereby make the drive frequency fo automatically track a change of the resonance frequency fr1.

The S0 signal indicating the current phase is input to the phase detection circuit 114. The AC voltage V0 generated by the VCO 202 is also input to the phase detection circuit 114 as an S2 signal indicating the voltage phase. The phase detection circuit 114 detects a deviation (phase difference) between the current phase and voltage phase from the S0 and S2 signals and generates a phase difference indicating voltage SC indicating the magnitude of the phase difference. Detecting the phase difference allows detection of the magnitude of the deviation between the resonance frequency fr1 and drive frequency fo. It is possible to make the drive frequency fo track the resonance frequency fr1 by controlling the drive frequency fo according to the phase difference indicating voltage SC. As the phase detection circuit 114, a built-in unit (Phase Comparator) (product serial number MC14046B) manufactured by Motorola is used, as in the case of the VCO 202.

For example, when the drive frequency fo and resonance frequency fr1 deviate from each other, the phase difference is accordingly increased, so that the phase detection circuit 114 generates the phase difference indicating voltage SC to instruct to reduce the phase difference. Thus, even if the resonance frequency fr1 changes, it is possible to keep the power transmission efficiency constant to thereby stably charge the lithium ion secondary battery 106.

The four feeding coils L2a to L2d are arranged in x-axis direction. When the wireless power receiver 118 passes through any one of the feeding coils L2a to L2d, AC power is supplied from the feeding coil L2. Receivers 112a to 112d are buried in correspondence with the feeding coils L2a to L2d. Further, a transmitter 110 is provided near the receiving coil L3 in the wireless power receiver 118 (vehicle).

The transmitter 110 transmits a position signal to the ground surface, and the receiver 112 receives the position signal. Upon reception of the position signal, the receiver 112 generates a detection signal. The voltage level (intensity) of the detection signal changes depending on the voltage level (reception intensity) of the received position signal. The detection signals from the receivers 112a to 112d are input respectively to the non-inversion terminals of comparators 122a to 122d. A reference potential Vref is set to the inversion terminal of each comparator 122. That is, when the voltage level of the detection signal is equal to or higher than the reference voltage Vref, the comparator 122 outputs high-level voltage.

Outputs of the comparators 122a to 122d are voltage-divided by resistors R5a to R5d, respectively, passed through buffers 124a to 124d, and supplied to photodiodes PDa to PDd. One ends of the photodiodes PDa to PDd are connected respectively to the buffers 124a to 124d, and the other ends thereof are grounded through a resistor R6. For example, when the receiver 112a receives a strong position signal, voltage higher than the reference potential Vref is supplied to the comparator 122a, causing the photodiode PDa to emit light. As a result, the switch SWa (photoswitch) disposed opposite to the photodiode PDa is turned ON, and the feeding coil L2a is connected to the transformer T2 secondary coil Li. Since the photodiodes PDa to PDd are diode-OR connected, two or more photodiodes PDs do not emit light simultaneously. The details of this will be described later using FIGS. 3 and 4.

As described above, the selection circuit 102 makes the four photodiodes PDa to PDd emit light in an exclusive manner to thereby make the four switches SWa to SWd into a conduction state in an exclusive manner. If two or more of the four feeding coils L2a to L2d are connected to the capacitor C2 simultaneously, the resonance frequency of the feeding coil circuit 120 deviates from the set value (100 kHz). In order to prevent this, the selection circuit 102 performs control such that only one of the four feeding coils L2a to L2d of the same inductance can be connected to the capacitor C2 so as to maintain the set value of the resonance frequency of the feeding coil circuit 120.

Figure 3:
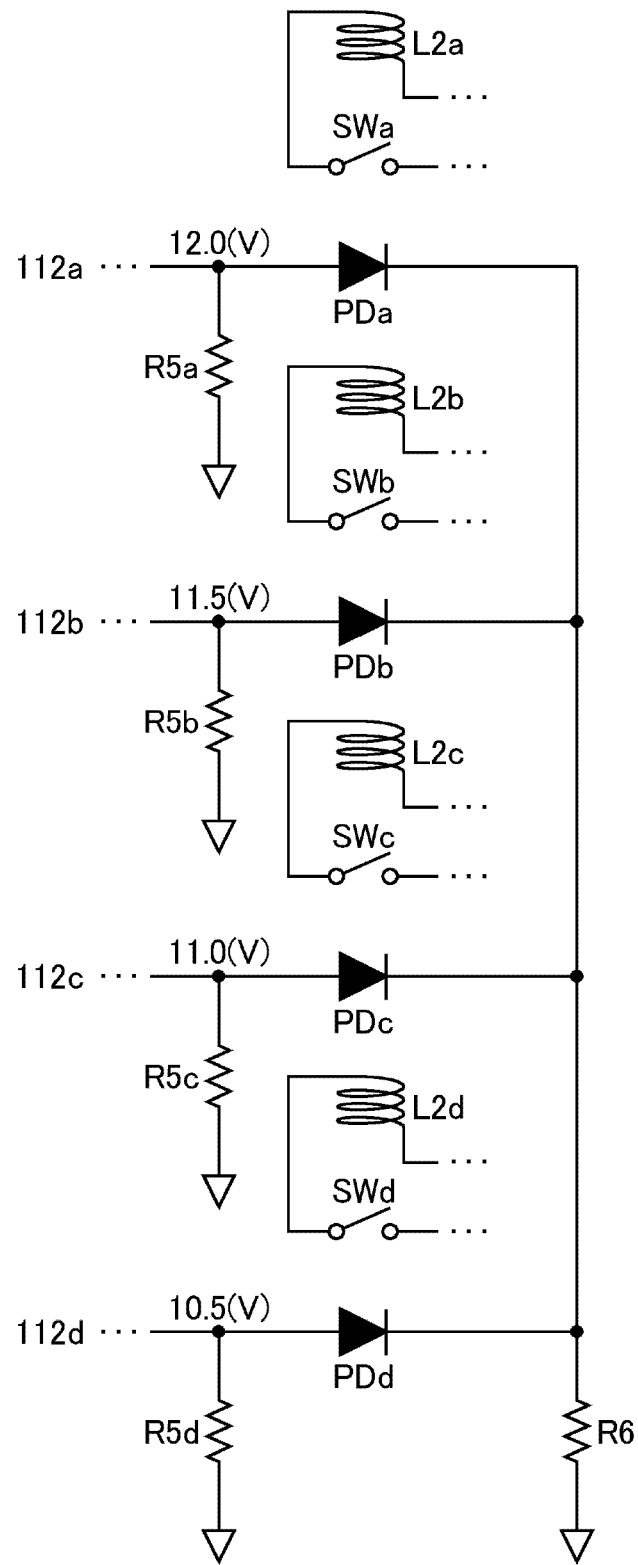
FIG. 3 is a view schematically illustrating diode-OR connection in a selection circuit.

FIG. 3 is a view schematically illustrating the diode-OR connection in the selection circuit 102. The photodiodes PDa to PDd receive the detection signals from the receivers 112a to 112d, respectively. As described above, when receiving the position signal from the transmitter 110, the receiver 112 generates the detection signal. The intensity of the detection signal changes depending on the intensity of the position signal, in other words, depending on the distance between the transmitter 110 and the receiver 112. When the detection signal is higher than the reference potential Vref, the photodiode PD emits light. Differences are provided among the resistors R5a to R5d corresponding to the photodiodes PDa to PDd. Concretely, the input voltages of the photodiodes PDa to PDd are set to 12.0 (V), 11.5 (V), 11.0 (V), and 10.5 (V), respectively. Due to the diode-OR connection, even if there are a plurality of the receivers 112 that generate the detection signal having a potential higher than the reference potential Vref, only one photodiode PD emits light. Although the input voltage of the photodiode is higher toward the left side (travel direction of the wireless power receiver 118) in FIG. 2, the setting value of the input voltage of each photodiode may arbitrarily set.

Figure 4:
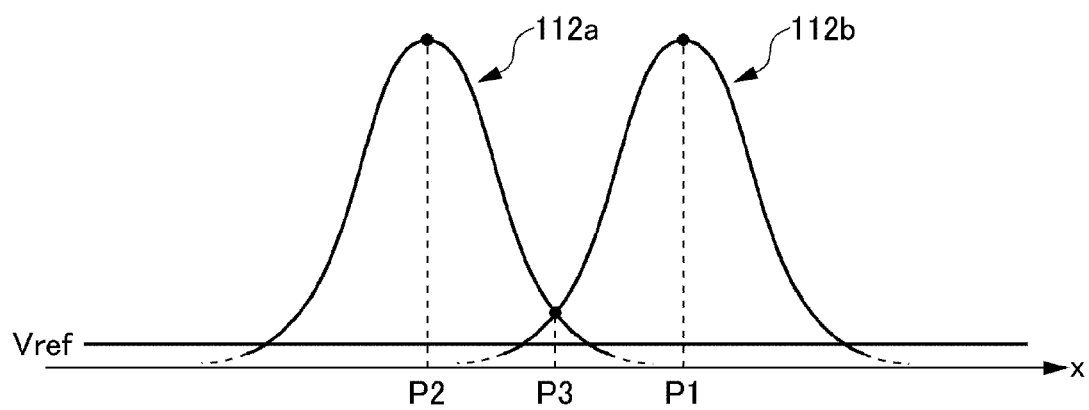
FIG. 4 is a graph illustrating the relationship between the position of a transmitter and intensity of a detection signal.

FIG. 4 is a graph illustrating the relationship between the position of the transmitter 110 and intensity of the detection signal. A position P1 corresponds to the position of the wireless power receiver 118 when the receiver 112b and the transmitter 110 are opposed to each other. At this time, the signal intensity of the detection signal of the receiver 112b becomes maximum. The other receivers 112a, 112c, and 112d do not each generate a detection signal higher than the reference potential Vref at the position P1, so that only the photodiode PDb emits light. As a result, power is fed from the feeding coil L2b to receiving coil L3 by wireless.

A position P2 corresponds to the position of the wireless power receiver 118 when the receiver 112a and the transmitter 110 are opposed to each other. At this time, only the photodiode PDa emits light for the same reason as above. As a result, power is fed from the feeding coil L2a to the receiving coil L3 by wireless.

A position P3 corresponds to a position obtained when the transmitter 110 is situated at the middle point between the receiver 112a and the receiver 112b. Although the detection signals from the receivers 112a and 112b are weaker than in the case of the positions P1 and P2, the potentials thereof exceed the reference voltage Vref. However, the photodiodes PDa and PDb are diode-OR connected, so that only the photodiode PDa emits light. In other words, when both the receivers 112a and 112b receive the position signal, only the photodiode PDa emits light, thereby effectively feeding power to the wireless power receiver 118.

To summarize, when the wireless power receiver 118 passes through the wireless power feeder 116, the actor of wireless power feeding changes sequentially in the order of the feeding coils L2d, L2c, L2b, and L2a. Further, switching of the feeding coils L2 is made such that only one feeding coil L2 is selected. As a result, stable wireless power feeding can be performed from the four feeding coils L2a to L2d. In addition, the power transmission efficiency can be made further stable by the function of automatically adjusting the drive frequency fo provided by the phase detection circuit 114. The automatic adjustment function of the drive frequency fo will be described in detail later using FIG. 5 and subsequent drawings.

Figure 5:
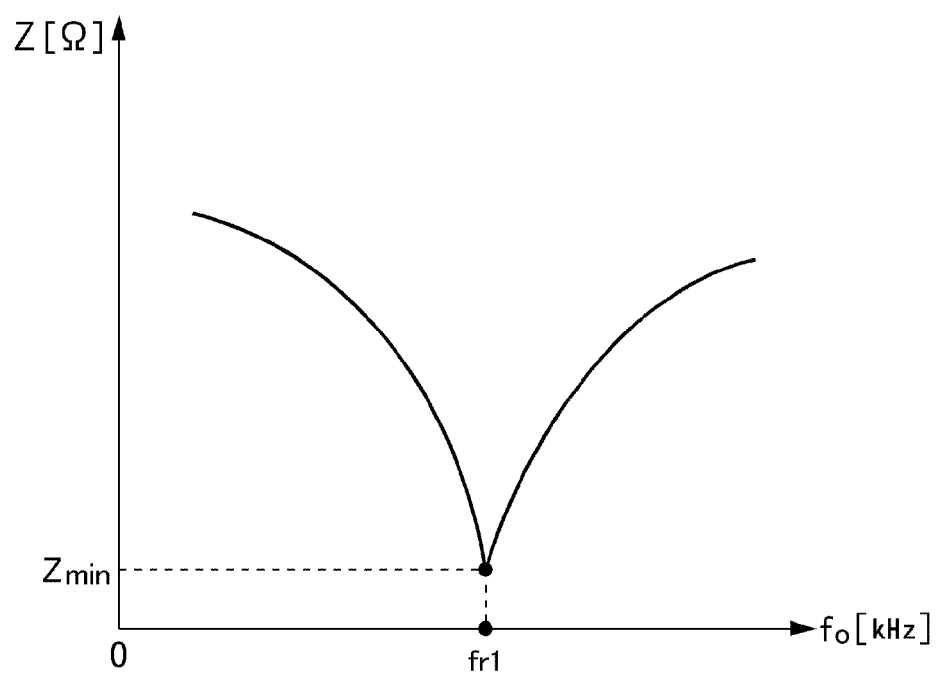
FIG. 5 is a graph illustrating the relationship between the impedance of a receiving coil circuit and drive frequency.

FIG. 5 is a graph illustrating a relationship between the impedance Z of the receiving coil circuit 130 and drive frequency fo. The vertical axis represents the impedance Z of the receiving coil circuit 130 (a circuit in which the capacitor C3 and the receiving coil L3 are connected in series). The horizontal axis represents the drive frequency fo. The impedance Z is a minimum value Zmin at the resonance state. Although Zmin=0 at the resonance state is ideal, Zmin does not become zero in general since some resistance components are included in the receiving coil circuit 130.

When the drive frequency fo and resonance frequency fr1 coincide with each other, the impedance Z becomes minimum and the receiving coil circuit 130 is in a resonance state. When the drive frequency fo and resonance frequency fr1 deviate from each other, one of the capacitive reactance and inductive reactance prevails the other, so that the impedance Z is also increased.

When the drive frequency fo coincides with the resonance frequency fr1, the AC current I2 flows in the feeding coil L2 at the resonance frequency fr1, and the AC current I3 also flows in the receiving coil circuit 130 at the resonance frequency fr1. The receiving coil L3 and capacitor C3 of the receiving coil circuit 130 resonate at the resonance frequency fr1, so that the power transmission efficiency from the feeding coil L2 to receiving coil L3 becomes maximum.

When the drive frequency fo and resonance frequency fr1 deviate from each other, the AC current I2 flows in the feeding coil L2 at a non-resonance frequency. Thus, the feeding coil L2 and receiving coil L3 do not magnetically resonate, resulting in abrupt degradation of power transmission efficiency.

Figure 6:
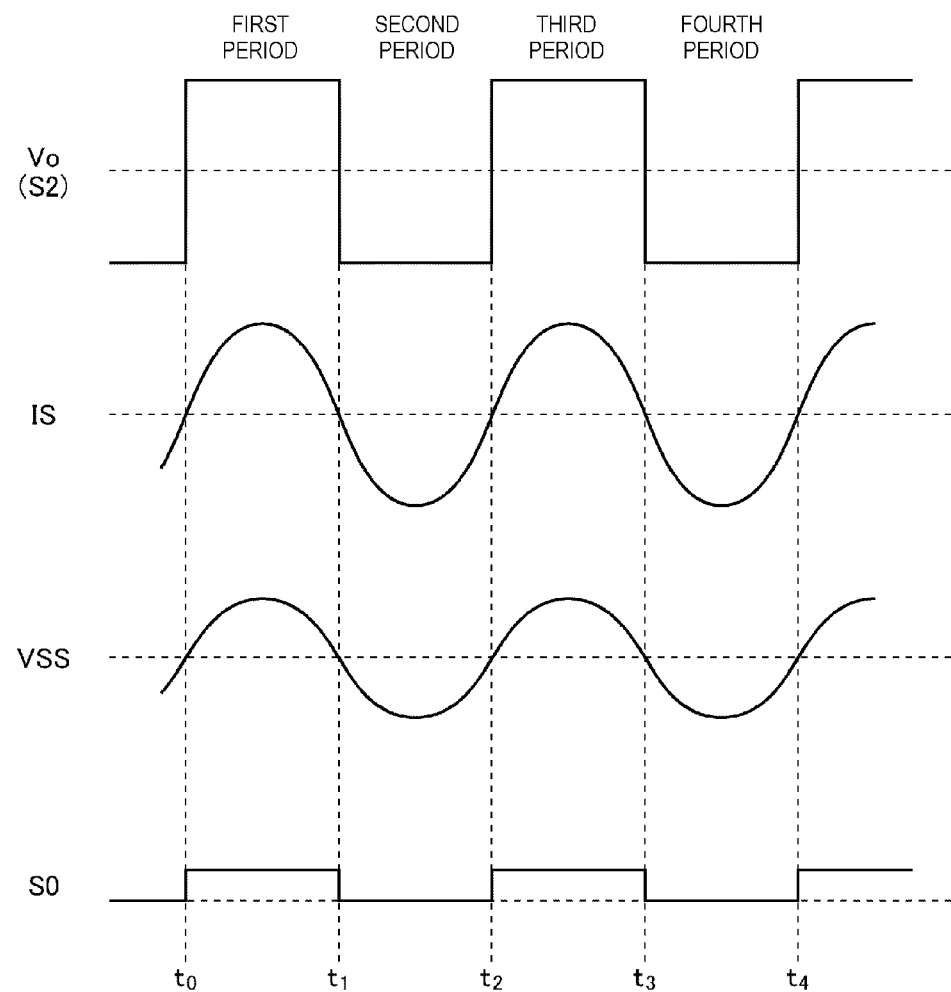
FIG. 6 is a time chart illustrating changing processes of the voltage and current when the drive frequency and resonance frequency coincide with each other.

FIG. 6 is a time chart illustrating a relationship between the voltage and current when the drive frequency fo and resonance frequency fr1 coincide with each other. Time period from time t0 to time t1 (hereinafter, referred to as "first period") is a time period during which the switching transistor Q1 is ON while the switching transistor Q2 is OFF. Time period from time t1 to time t2 (hereinafter, referred to as "second period") is a time period during which the switching transistor Q1 is OFF while the switching transistor Q2 is ON. Time period from time t2 to time t3 (hereinafter, referred to as "third period") is a time period during which the switching transistor Q1 is ON while the switching transistor Q2 is OFF. Time period from time t3 to time t4 (hereinafter, referred to as "fourth period") is a time period during which the switching transistor Q1 is OFF while the switching transistor Q2 is ON.

When the gate-source voltage VGS1 of the switching transistor Q1 exceeds a predetermined threshold Vx, the switching transistor Q1 is in a saturated state. Thus, when the switching transistor Q1 is turned ON (conductive) at time to which is the start timing of the first time period, the source-drain current IDS1 starts flowing. In other words, the current IS starts flowing in the positive direction (in the first current path).

When the switching transistor Q1 is turned OFF (non-conductive) at time t1 which is the start timing of the second time period, the source-drain current IDS1 does not flow. Instead, the switching transistor Q2 is turned ON (conductive), and source/drain current IDS2 starts flowing. That is, the current IS starts flowing in the negative direction (in the second current path).

The current IS and inductive current ISS have the same phase, and S0 signal and inductive current ISS have the same phase. Therefore, the current waveform of the current IS and voltage waveform of the S0 signal synchronize with each other. By observing the S0 signal, the current phase of the current IS (source-drain currents IDS1 and IDS2) can be measured. In the third to fourth and subsequent time periods, the same waveform as in the first and second time periods repeats.

Even in the case where the potential VSS assumes an analog waveform, the comparator 142 can generate the S0 signal of a digital waveform. The potential VSS changes in synchronization with the current IS. The phase detection circuit 114 compares the rising edge time of the S2 signal (drive voltage V0) and rising edge time of the S0 signal to calculate the phase difference td. The comparator 142 converts (shapes) the VSS into a digital waveform to allow the phase detection circuit 114 to easily detect the phase difference td. As a matter of course, the phase detection circuit 114 may directly compare the VSS and Vo for detection of the phase difference td.

Figure 7:
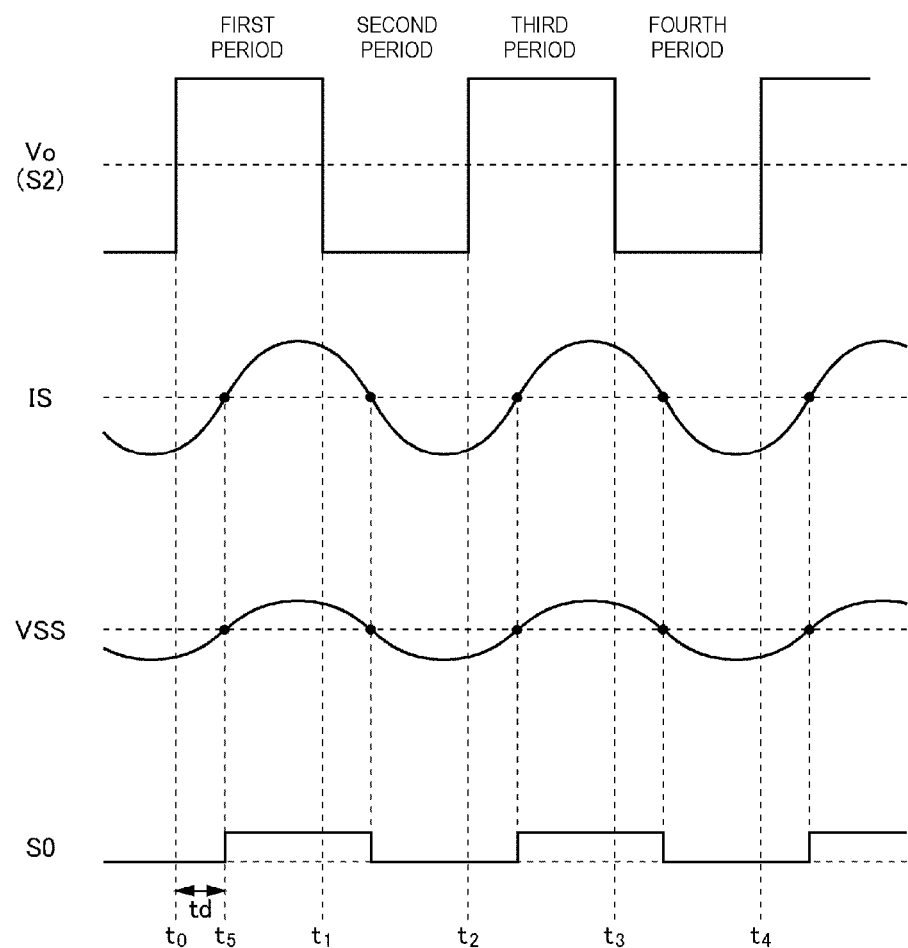
FIG. 7 is a time chart illustrating changing processes of the voltage and current when the drive frequency is higher than the resonance frequency.

FIG. 7 is a time chart illustrating changing processes of the voltage and current when the drive frequency fo is higher than the resonance frequency fr1. In the case where the drive frequency fo is higher than the resonance frequency fr1, an inductive reactance component appears in the impedance Z of the receiving coil circuit 130, and the current phase of the AC current IS delays with respect to the voltage phase. As described above, the current IS and S0 signal have the same phase, so that by comparing the voltage waveforms of the S0 signal and S2 signal, the phase difference td between the current phase and voltage phase in the supply power can be detected.

As illustrated in FIG. 6, when the drive frequency fo and resonance frequency fr1 coincide with each other, the current IS starts flowing at time t0 which is the start timing of the first time period, and VSS becomes higher than zero. In this case, the phase difference td is zero. When the drive frequency fo is higher than the resonance frequency fr1, the current ISS starts flowing at time t5 which is later than time t0, and VSS becomes higher than zero, so that the phase difference td (=t0−t5) becomes less than 0. When the drive frequency fo and resonance frequency fr1 deviate from each other, the power transmission efficiency is degraded, so that the amplitudes of the current IS and VSS become smaller than those at the resonance time.

Figure 8:
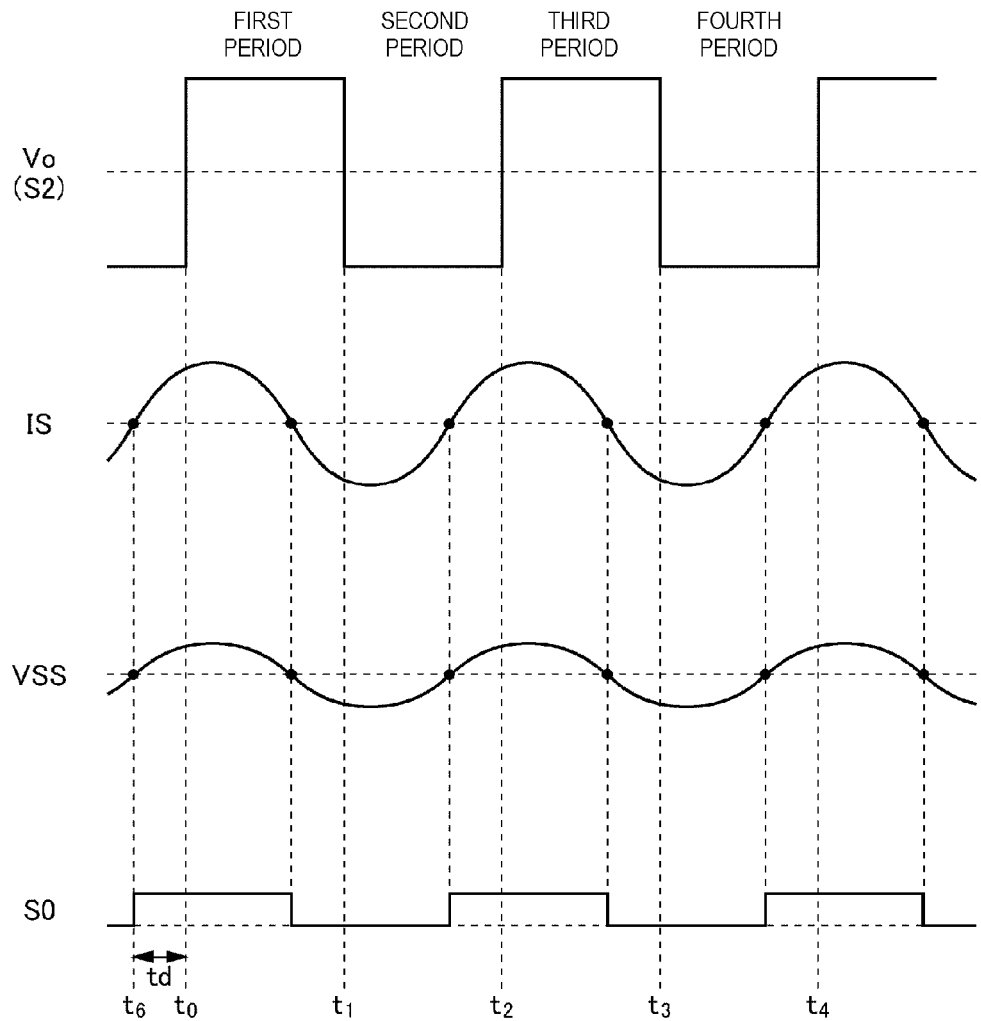
FIG. 8 is a time chart illustrating changing process of the voltage and current when the drive frequency is lower than the resonance frequency.

FIG. 8 is a time chart illustrating changing process of the voltage and current when the drive frequency is lower than the resonance frequency. In the case where the drive frequency fo is lower than the resonance frequency fr1, a capacitive reactance component appears in the impedance Z, and the current phase of the current IS advances with respect to the voltage phase. Thus, the current IS starts flowing at time t6 which is earlier than time t0. In this case, the phase difference td (=t0−t6) is more than 0. The amplitudes of the current IS and VSS become smaller than that at the resonance time.

Figure 9:
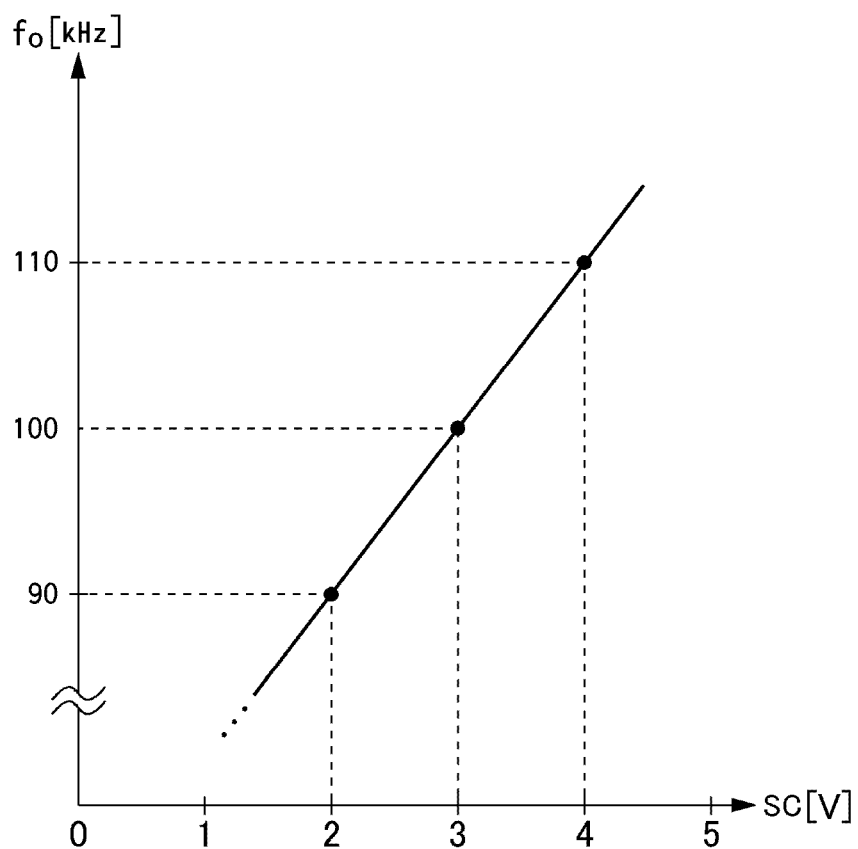
FIG. 9 is a graph illustrating the relationship between a phase difference indicating voltage and drive frequency.

FIG. 9 is a graph illustrating the relationship between the phase difference indicating voltage SC and drive frequency fo. The relationship illustrated in FIG. 9 is set in the VCO 202. The magnitude of the phase difference td is proportional to the variation of the resonance frequency fr1. Thus, the phase detection circuit 114 determines the variation of the phase difference indicating voltage SC in accordance with the phase difference td and determines the drive frequency fo in accordance with the variation of the phase difference indicating voltage SC.

The resonance frequency fr1 (=fr0) is 100 kHz in the initial state and, accordingly, the drive frequency fo is set to 100 kHz. The phase difference indicating voltage SC is initially set to 3.0 (V). Here, it is assumed that the resonance frequency fr1 changes from 100 kHz to 90 kHz. Since the drive frequency fo (=100 kHz) is higher than the resonance frequency fr1 (=90 kHz) in this state, the phase difference td is less than 0. The phase difference td is proportional to the variation (−10 kHz) of the resonance frequency fr1. The phase detection circuit 114 determines the variation of the phase difference indicating voltage SC based on the phase difference td. In this example, the phase detection circuit 114 sets the variation of the phase difference indicating voltage SC to −1 (V) and outputs new phase difference indicating voltage SC=2 (V). The VCO 202 outputs the drive frequency fo=90 kHz corresponding to the phase difference indicating voltage SC=2.0 (V) according to the relationship represented by the graph of FIG. 9. With the above processing, it is possible to make the drive frequency fo to automatically track a change of the resonance frequency fr1.

Figure 10:
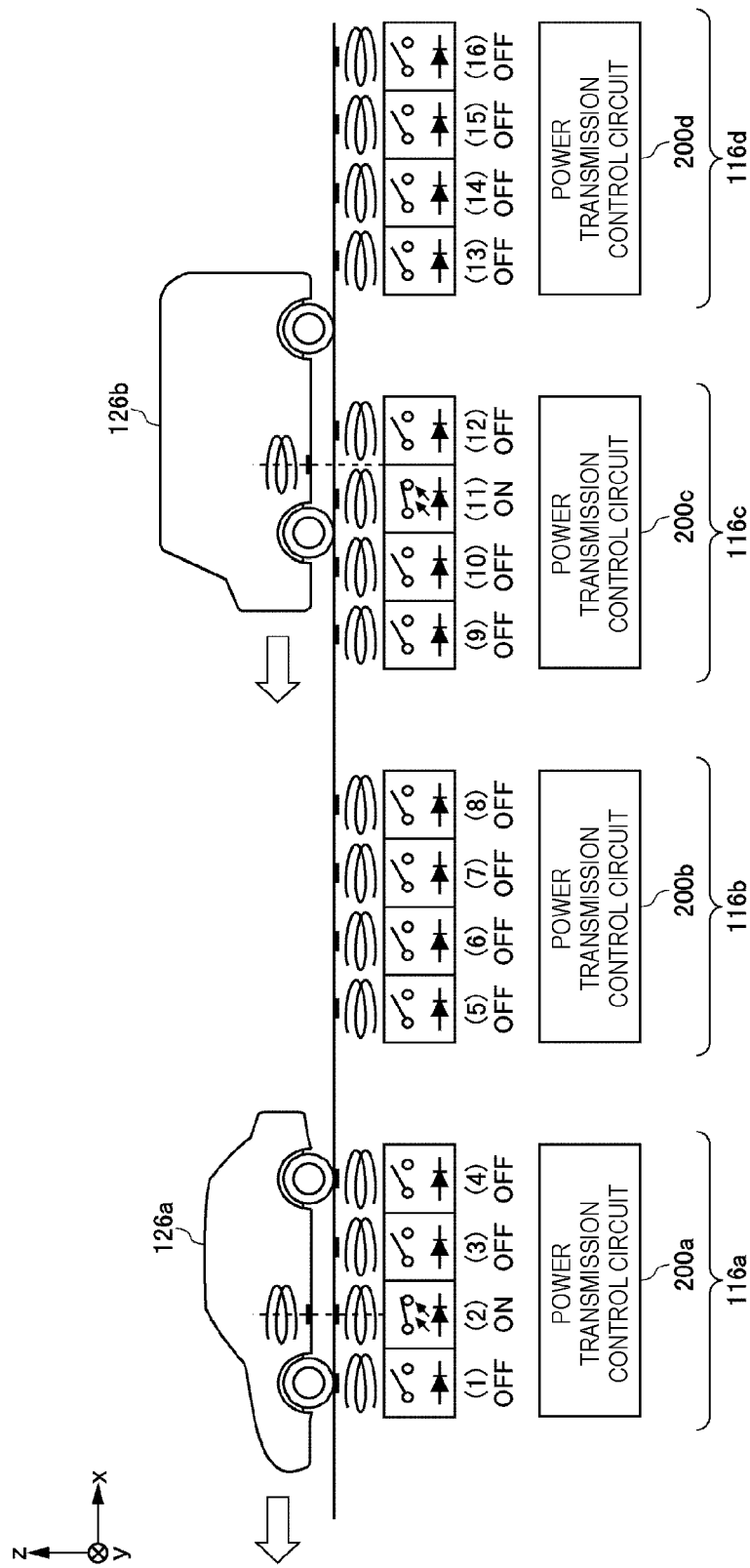
FIG. 10 is a view schematically illustrating a state where power is fed to a plurality of vehicles by wireless by means of a plurality of the wireless power feeders buried in the ground.

FIG. 10 is a view schematically illustrating a state where power is fed to a plurality of vehicles 126 by wireless by means of a plurality of the wireless power feeders 116 buried in the ground. In the present embodiment, one wireless power feeder 116 controls four feeding coils L2. In the example of FIG. 10, four wireless power feeders 116a to 116d are buried, so that the total number of the feeding coils L2 is 16. Vehicles 126a and 126b, which are each an EV, travel on the ground.

The vehicle 126a is passing above the wireless power feeder 116a. The vehicle 126b is passing above the wireless power feeder 116c. As a result, the vehicle 126a receives power from the wireless power feeder 116a, and the vehicle 126b receives power from the wireless power feeder 116c.

The position signal transmitted from the vehicle 126 may include ID information of the vehicle. For example, an information of license plate may be used as the ID information. A configuration may be possible in which the wireless power feeder 116a notifies, through a communication line such as the Internet, an external device of the ID information and wirelessly-fed electric energy for charging a fee to the owner of the vehicle 126 at a future date.

The vehicle 126 need not always transmit the position signal. When control is performed such that the vehicle 126 automatically transmits the position signal when the amount of charge of the lithium ion secondary battery 106 falls within a predetermined value, a driver of the vehicle 126 can continue driving without consciousness of a state of the lithium ion secondary battery 106. As a matter of course, the driver him or herself may control ON/OFF of the position signal. The wireless power feeder 116 may be installed on a direct course or a location, such as intersection, where low-speed running is required. Alternatively, the wireless power feeder 116 may be installed at a place, such as parking space, where the vehicle utilizes the wireless power feeding during stoppage.

Figure 11:
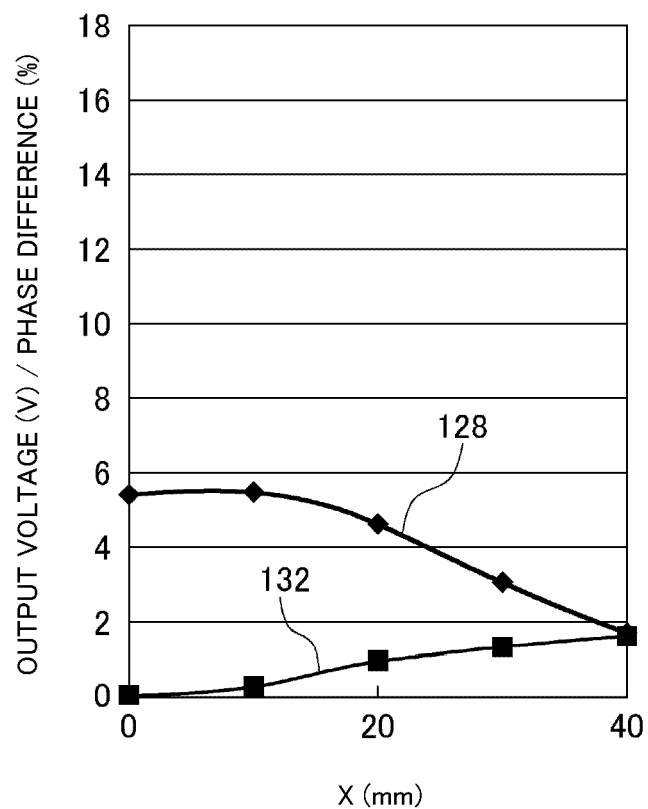
FIG. 11 is a graph illustrating the relationship among the position of the wireless power receiver, output voltage, and phase difference when the drive frequency is set to a fixed value.

FIG. 11 is a graph illustrating the relationship among the position of the wireless power receiver 118, output voltage, and phase difference when the drive frequency fo is set to a fixed value. This graph represents experimental data obtained when the voltage of the DC power supply VDD is set to 25 (V) and a load of 5 (Ω) is connected in place of the lithium ion secondary battery 106. It is assumed in this experiment that the diameters of the feeding coil L2 and receiving coil L3 are 100 (mm), and inter-coil distance between the feeding coil L2 and receiving coil L3 is 20 (mm). When the transmitter 110 and receiver 112 are completely opposed to each other, x is set to 0 (mm). The resonance frequency of the feeding coil circuit 120 is set to 170 kHz. According to an output voltage characteristic curve 128 and a phase difference characteristic curve 132 of FIG. 11, when the deviation between the transmitter 110 and receiver 112 falls within about 15 (mm), the output voltage can be increased to 5 (V) or more while the phase difference can be reduced to 1(%) or less. Thus, it is desirable to arrange the feeding coils L2 such that the actor of the wireless feeding is switched from one feeding coil L2 to the next feeding coil L2 before the deviation between the transmitter 110 and receiver 112 becomes 15 (mm) or more when the frequency tracking is not implemented.

Figure 12:
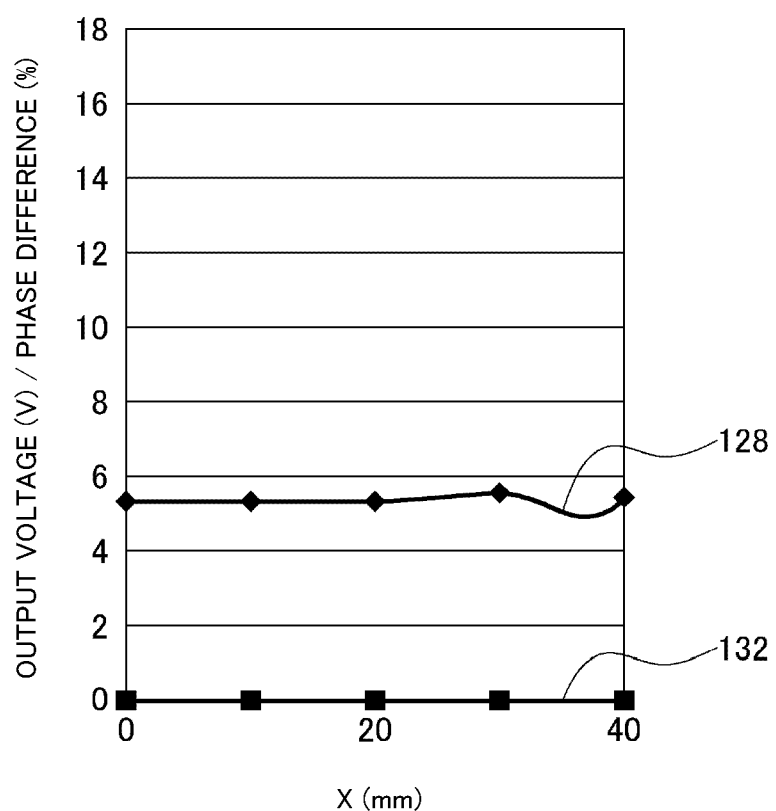
FIG. 12 is a graph illustrating the relationship among the position of the wireless power receiver, output voltage, and phase difference when the drive frequency is made variable.

FIG. 12 is a graph illustrating the relationship among the position of the wireless power receiver 118, output voltage, and phase difference when the drive frequency fo is made variable. When the frequency tracking by the phase detection circuit 114 is implemented, both the output voltage and phase difference can be made stable even if the inter-coil distance is equal to or less than about 40 (mm).

Figure 13:
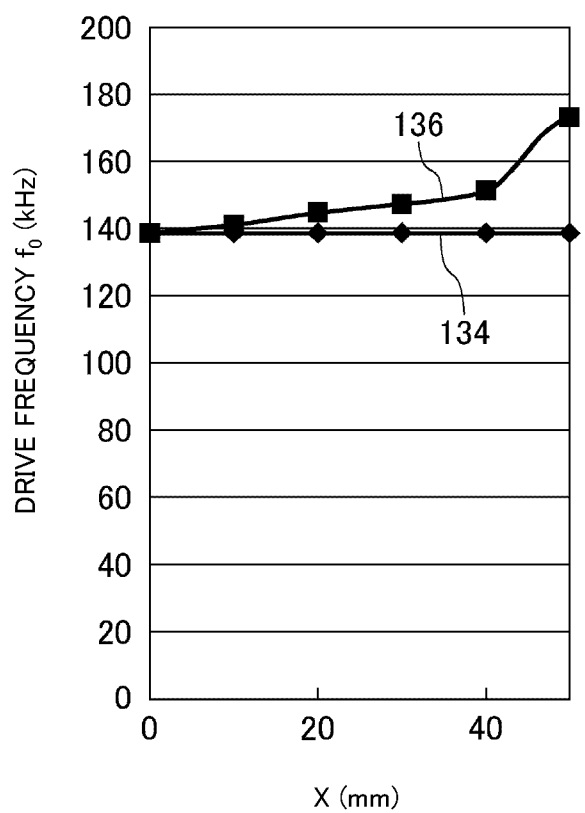
FIG. 13 is a graph illustrating the relationship between the drive frequency and position of the wireless power receiver.

FIG. 13 is a graph illustrating the relationship between the drive frequency fo and position of the wireless power receiver 118. A drive frequency tracking method 136 represents frequency characteristics obtained when the drive frequency fo is made to track the resonance frequency fr1 by the phase detection circuit 114. A drive frequency fixing method 134 represents frequency characteristics obtained when the drive frequency fo is set to a fixed value. In the case of the drive frequency tracking method 136, the drive frequency fo is adjusted by feedback control even if x is 50 (mm).

Second Embodiment

Figure 14:
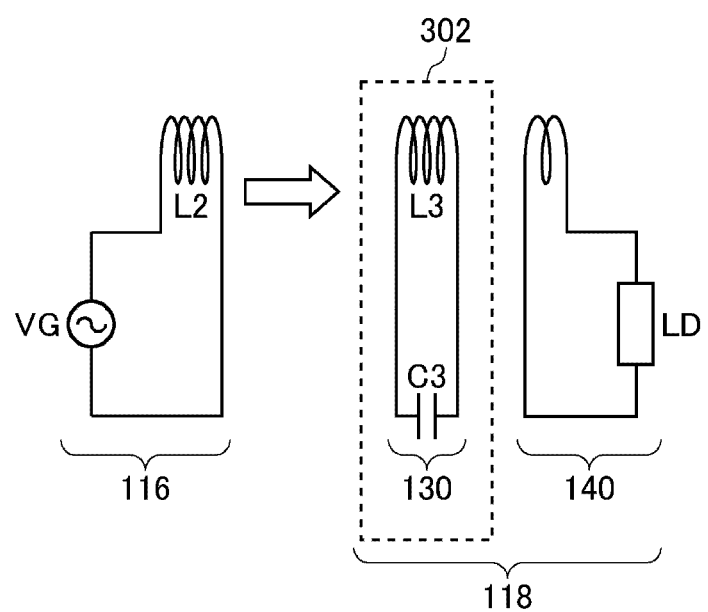
FIG. 14 is a view illustrating operation principle of the wireless power transmission system according to a second embodiment.

FIG. 14 is a view illustrating operation principle of the wireless power transmission system 100 according to a second embodiment. As in the case of the first embodiment, the wireless power transmission system 100 according to the second embodiment includes the wireless power feeder 116 and wireless power receiver 118. However, although the wireless power receiver 118 includes the power receiving LC resonance circuit 302, the wireless power feeder 116 does not include the power feeding LC resonance circuit 300. That is, the feeding coil L2 does not constitute a part of the LC resonance circuit. More specifically, the feeding coil L2 does not form any resonance circuit with other circuit elements included in the wireless power feeder 116. No capacitor is connected in series or in parallel to the feeding coil L2. Thus, the feeding coil L2 does not resonate in a frequency at which power transmission is performed.

The power feeding source VG supplies AC current of the resonance frequency fr1 to the feeding coil L2. The feeding coil L2 does not resonate but generates an AC magnetic field of the resonance frequency fr1. The receiving LC resonance circuit 302 resonates by receiving the AC magnetic field. As a result, large AC current flows in the power receiving LC resonance circuit 302. Studies conducted by the present inventor have revealed that formation of the LC resonance circuit is not essential in the wireless power feeder 116. The feeding coil L2 does not constitute a part of the power feeding LC resonance circuit, so that the wireless power feeder 116 does not resonate at the resonance frequency fr1. It has been generally believed that, in the wireless power feeding of a magnetic field resonance type, making resonance circuits which are formed on both the power feeding side and power receiving side resonate at the same resonance frequency fr1 (=fr0) allows power feeding of large power. However, it is found that even in the case where the wireless power feeder 116 does not contain the power feeding LC resonance circuit 300, if the wireless power receiver 118 includes the power receiving LC resonance circuit 302, the wireless power feeding of a magnetic field resonance type can be achieved.

Even when the feeding coil L2 and receiving coil L3 are magnetic-field-coupled to each other, a new resonance circuit (new resonance circuit formed by coupling of resonance circuits) is not formed due to absence of the capacitor C2. In this case, the stronger the magnetic field coupling between the feeding coil L2 and receiving coil L3, the greater the influence exerted on the resonance frequency of the power receiving LC resonance circuit 302. By supplying AC current of this resonance frequency, that is, a frequency near the resonance frequency fr1 to the feeding coil L2, the wireless power feeding of a magnetic field resonance type can be achieved. In this configuration, the capacitor C2 need not be provided, which is advantageous in terms of size and cost.

Figure 15:
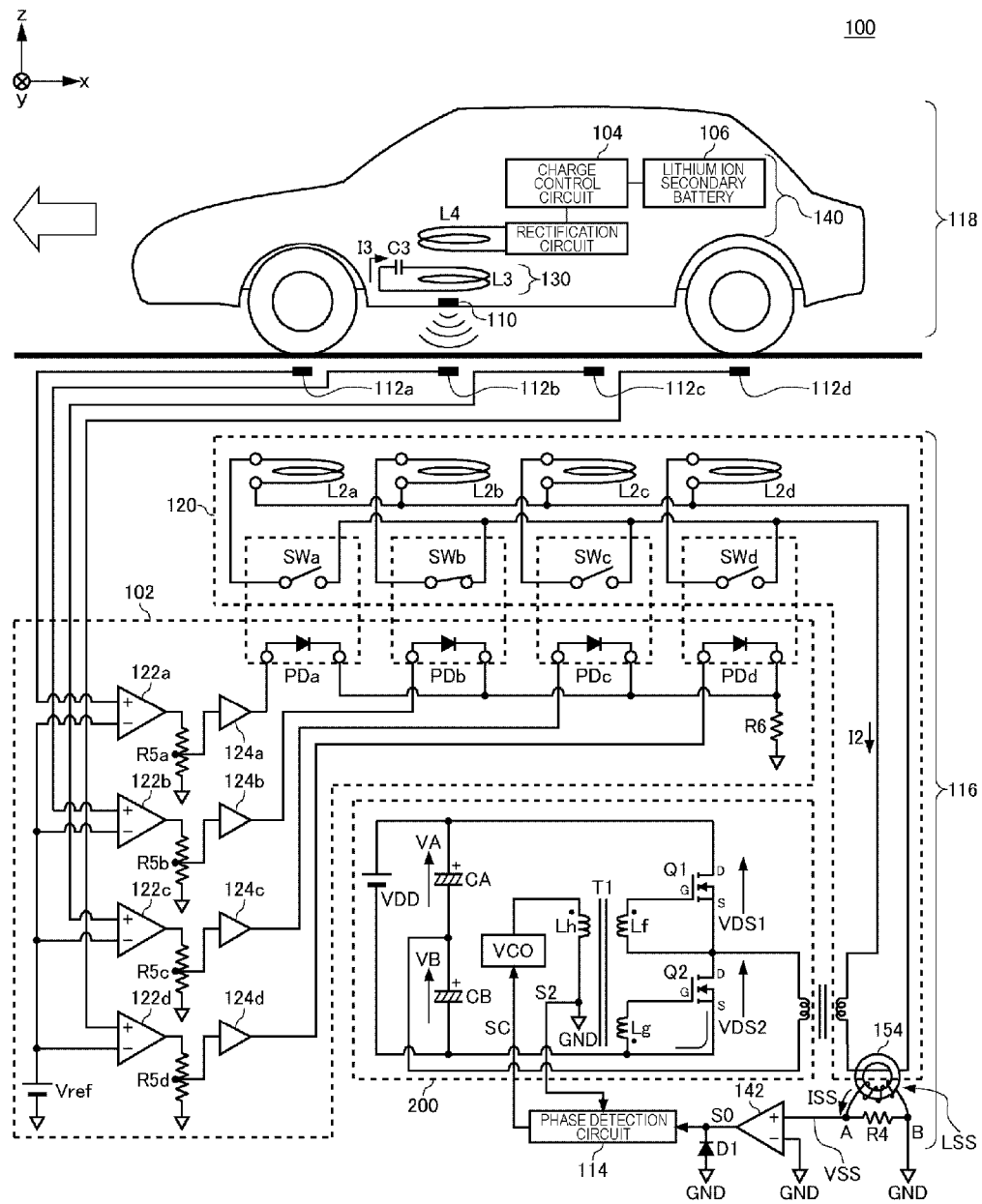
FIG. 15 is a system configuration view of the wireless power transmission system according to the second embodiment.

FIG. 15 is a system configuration view of the wireless power transmission system 100 according to the second embodiment. In the wireless power transmission system 100 according to the second embodiment, the capacitor C2 provided in the wireless power transmission system 100 of the first embodiment is omitted. Other points are the same as the first embodiment.

Third Embodiment

Figure 16:
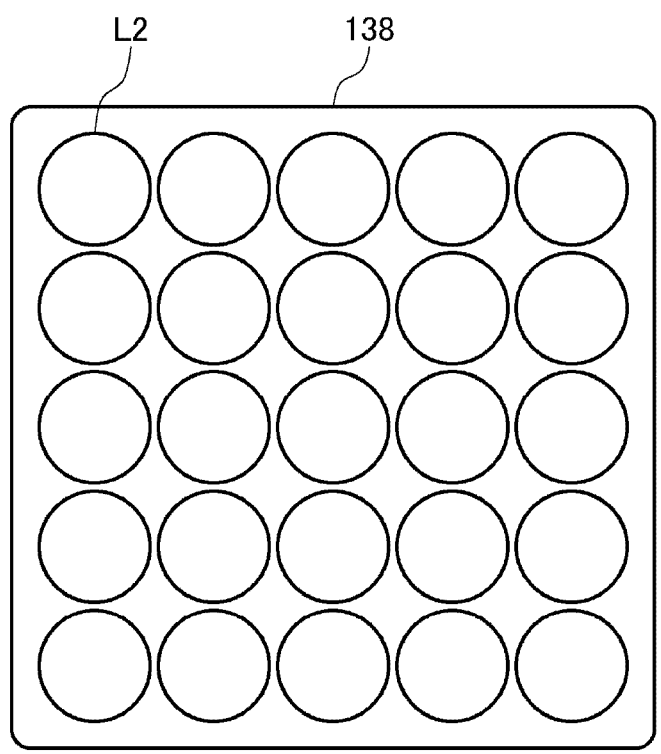
FIG. 16 is a plan view of a table in which a plurality of feeding coils L2 are buried.

FIG. 16 is a plan view of a table 138 in which a plurality of feeding coils L2 are buried. The feeding coil L2 may be arranged not only in a line but also in a two-dimensional manner on a plane as the surface of the table 138.

Figure 17:
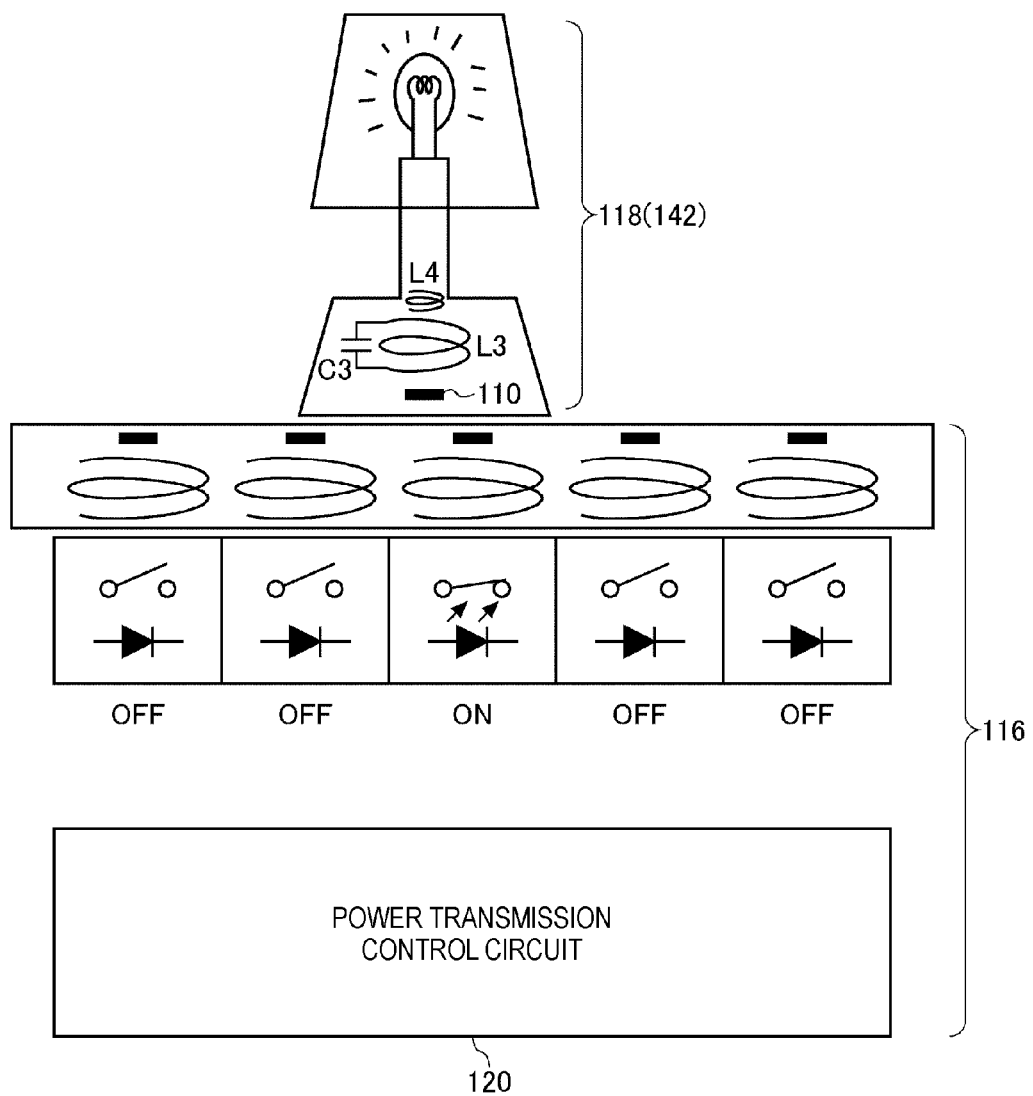
FIG. 17 is a cross-sectional view illustrating a state where a lamp formed as the wireless power receiver is disposed on the table.

FIG. 17 is a cross-sectional view illustrating a state where a lamp 142 formed as the wireless power receiver 118 is disposed on the table 138. The wireless power feeder 116 of the first and second embodiments may be formed so as to control the plurality of feeding coils L2 two-dimensionally arranged on the table 138. The lamp 142 is formed as the wireless power receiver 118 including the receiving coil L3 and loading coil L4. One feeding coil L2 is selected depending on the position at which the lamp 142 is placed. As a result, power is fed by wireless from the most appropriate feeding coil L2 to the lamp 142 irrespective of the position of the lamp 142.

Fourth Embodiment

Figure 18:
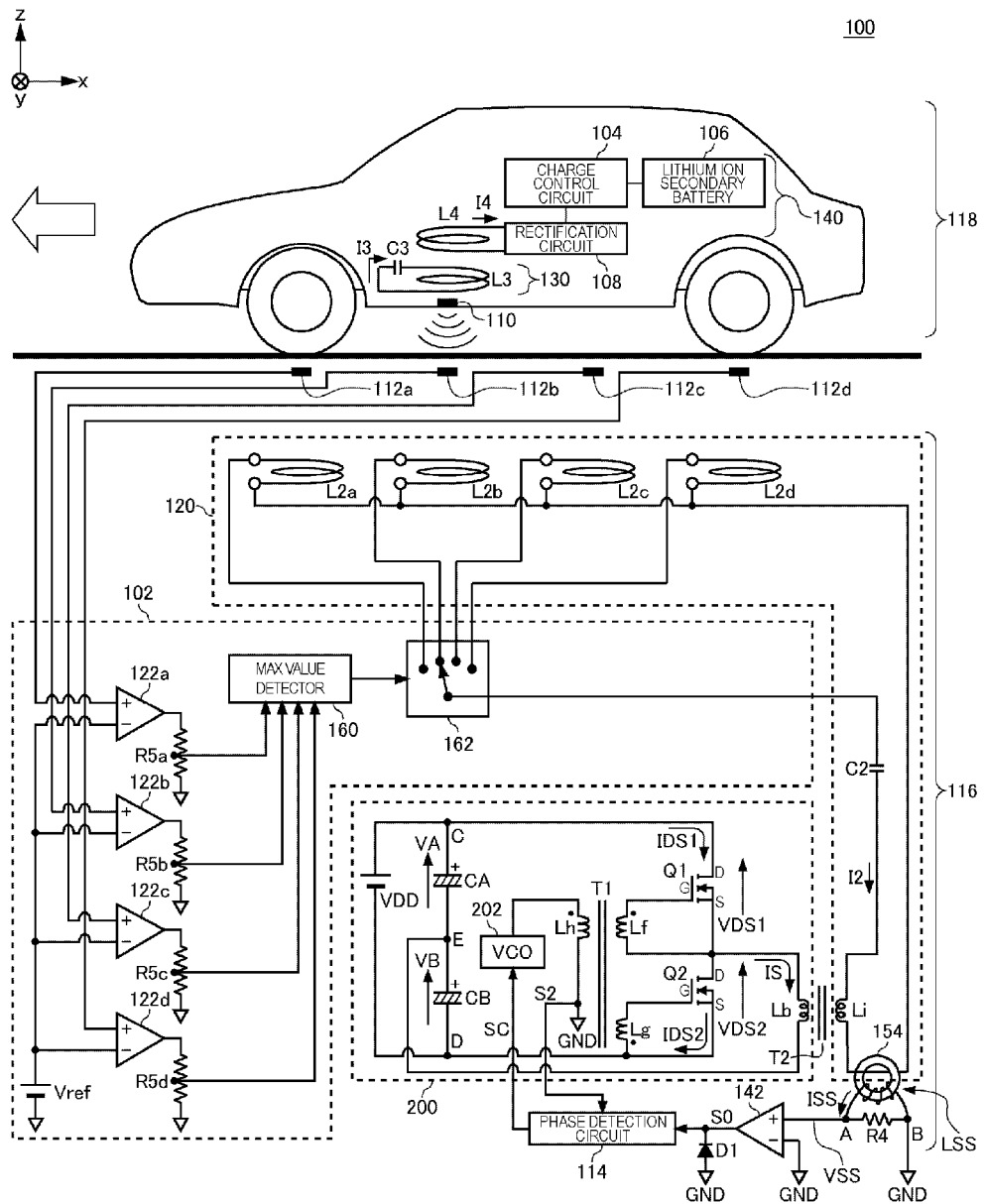
FIG. 18 is a system configuration view of the wireless power transmission system according to a fourth embodiment.

FIG. 18 is a system configuration view of the wireless power transmission system 100 according to a fourth embodiment. The wireless power feeder 116 according to the fourth embodiment includes, as basic components, the power transmission control circuit 200, feeding coil circuit 120, selection circuit 102, and phase detection circuit 114. The wireless power feeder 118 includes the receiving coil circuit 130 and loading circuit 140.

The four feeding coils L2 in the fourth embodiment are selectively connected to the transformer T2 secondary coil Li under the control of a connection control circuit 162 and a maximum value detector 160. Two or more feeding coils L2 are not connected to the transformer T2 secondary coil Li simultaneously.

The transmitter 110 transmits the position signal to the ground, and the receiver 112 receives the position signal. The detection signals from the receivers 112a to 112d are input respectively to the non-inversion terminals of the comparators 122a to 122d. The reference potential Vref is set to the inversion terminal of each comparator 122. That is, when the voltage level of the detection signal is or higher than the reference voltage Vref, the comparator 122 outputs high-level voltage.

Outputs of the comparators 122a to 122d are voltage-divided by resistors R5a to R5d, respectively, and are supplied to the maximum value detector 160. The maximum value detector 160 selects a comparator 122 having the maximum output and supplies a selection signal representing the selection result to the connection control circuit 162. Differences are provided among the resistors R5a to R5d. Concretely, the maximum output voltages of the comparators 122a to 122d are set to 12.0 (V), 11.5 (V), 11.0 (V), and 10.5 (V), respectively. The maximum value does not coincide among the comparators 122a to 122d, so that the maximum value detector 160 does not select two or more comparators 122 simultaneously.

The connection control circuit 162 selects one of the four feeding coils L2 according to the selection signal. For example, when the receiver 112a receives the strongest position signal, the feeding coil L2a is connected to the transformer T2 secondary coil Li.

Figure 19:
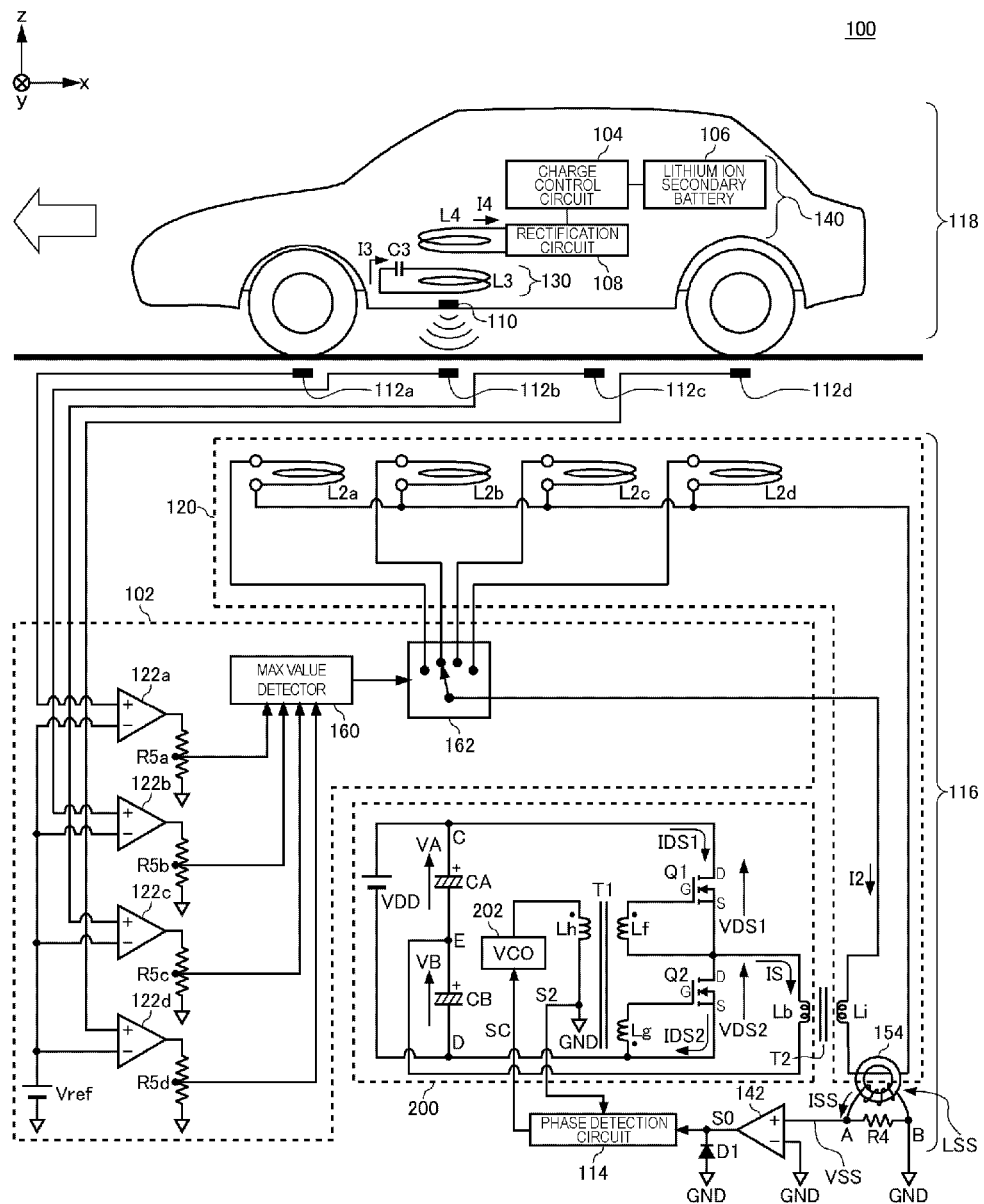
FIG. 19 is a system configuration view of the wireless power transmission system according to a fifth embodiment.

FIG. 19 is a system configuration view of the wireless power transmission system 100 according to a fifth embodiment. In the wireless power transmission system 100 according to the fifth embodiment, the capacitor C2 provided in the wireless power transmission system 100 of the first embodiment is omitted. Other points are the same as the first embodiment.

The wireless power transmission systems 100 according to the above embodiments have been described. According to the wireless power transmission systems 100 of the first and second embodiments, the most appropriate one of the plurality of feeding coils L2 can be selected depending on the position of the EV. Further, power to be supplied to the EV can be made further stable by the frequency tracking function. In particular, the capacitor C2 need not be provided in the second embodiment, so that it is possible to lower the frequency level and to reduce cost and size. Also in the third embodiment, favorable wireless power feeding can be achieved irrespective of the position of the lamp 142.

The present invention has been described based on the above embodiments. It should be understood by those skilled in the art that the above embodiments are merely exemplary of the invention, various modifications and changes may be made within the scope of the claims of the present invention, and all such variations may be included within the scope of the claims of the present invention. Thus, the descriptions and drawings in this specification should be considered as not restrictive but illustrative.

The "AC power" used in the wireless power transmission system 100 may be transmitted not only as an energy but also as a signal. Even in the case where an analog signal or digital signal is fed by wireless, the wireless power feeding method of the present invention may be applied. The wireless power transmission system 100 may selectively control one of the plurality of wireless power feeders 116 depending on the stop position of a moving object. Further, the wireless power feeder 116 may be buried not only in the ground but also in the floor or wall of a building.

What is claimed is:

1. A wireless power feeder that feeds power from a feeding coil to a receiving coil by wireless using a magnetic field resonance phenomenon between the feeding coil and receiving coil, said feeder comprising:
   a capacitor;
   a plurality of the feeding coils;
   a plurality of receivers that are provided respectively in correspondence with the plurality of feeding coils and each receives a position signal from a receiving body having the receiving coil;
   a power transmission control circuit that supplies AC power at a drive frequency to the feeding coil corresponding to the receiver that has received the position signal to allow the feeding coil to feed AC power to the receiving coil; and
   a selection circuit for selecting a receiver from the plurality of receivers, the selection circuit including a plurality of photodiodes,
   wherein an input of each of the plurality of photodiodes is connected to a corresponding receiver of the plurality of receivers,
   wherein an output of each of the plurality of photodiodes is connected to a common line,
   wherein the power transmission control circuit supplies the AC power to the feeding coil corresponding to the selected receiver,
   wherein any one of the feeding coils is selectively connected to the capacitor, the selected feeding coil and the capacitor resonate at a resonance frequency, and
   the power transmission control circuit adjusts the drive frequency to the resonance frequency.

2. The wireless power feeder according to claim 1, further comprising a phase detection circuit that detects the phase difference between the voltage phase and current phase of the AC power.

3. The wireless power feeder according to claim 2, wherein the power transmission control circuit adjusts the drive frequency such that the detected phase difference is reduced.

4. A wireless power receiver that receives AC power fed from the wireless power feeder as claimed in claim 1 by wireless at a receiving coil, said receiver comprising:
   the receiving coil;
   a transmitter that transmits a position signal representing the position of the wireless power receiver; and
   a loading coil that is magnetically coupled to the receiving coil to receive the AC power that the receiving coil has received from the feeding coil.

5. The wireless power receiver that receives AC power fed from the wireless power feeder according to claim 4, further comprising a storage battery that is connected to the loading coil and is charged by the received AC power.

6. The wireless power receiver that receives AC power fed from the wireless power feeder according to claim 4, wherein
   the wireless power receiver is constructed as a moving body that uses the AC power received by the loading coil as a power source.

7. The wireless power feeder according to claim 1, wherein the selection circuit is configured so as to exclusively select one of the receivers when two or more receivers have received the position signal.

8. The wireless power feeder according to claim 7, wherein the plurality of photodiodes have different input voltages relative to each other.

9. A wireless power feeder that feeds power from a feeding coil to a receiving coil by wireless using a magnetic field resonance phenomenon between the feeding coil and receiving coil, said feeder comprising:
   a plurality of the feeding coils;
   a plurality of receivers that are provided respectively in correspondence with the plurality of feeding coils and each receives a position signal from a receiving body having the receiving coil;
   a power transmission control circuit that supplies AC power at a drive frequency to the feeding coil corresponding to the receiver that has received the position signal to allow the feeding coil to feed AC power to the receiving coil; and
   a selection circuit for selecting a receiver from the plurality of receivers, the selection circuit including a plurality of photodiodes,
   wherein an input of each of the plurality of photodiodes is connected to a corresponding receiver of the plurality of receivers,
   wherein an output of each of the plurality of photodiodes is connected to a common line,
   wherein the power transmission control circuit supplies the AC power to the feeding coil corresponding to the selected receiver, and
   wherein the feeding coil does not form, together with circuit elements on the power feeding side, a resonance circuit having a resonance point corresponding to the resonance frequency of the receiving coil.

10. The wireless power feeder according to claim 9, wherein
    the power transmission control circuit makes the feeding coil that does not substantially resonate with circuit elements on the power feeding side feed the AC power to the receiving coil.

11. The wireless power feeder according to claim 9,
    wherein no capacitor is connected in series or in parallel to the feeding coil.

12. The wireless power feeder according to claim 9, wherein the selection circuit is configured so as to exclusively select one of the receivers when two or more receivers have received the position signal.

13. The wireless power feeder according to claim 12, wherein the plurality of photodiodes have different input voltages relative to each other.

\* \* \* \* \*